(12) United States Patent
Chow

(10) Patent No.: US 9,901,217 B2
(45) Date of Patent: Feb. 27, 2018

(54) APPARATUS FOR PREPARING EGGS

(71) Applicant: Doris King Chow, Upper Marlboro, MD (US)

(72) Inventor: Doris King Chow, Upper Marlboro, MD (US)

( * ) Notice: Subject to any disclaimer, the term of this patent is extended or adjusted under 35 U.S.C. 154(b) by 0 days.

(21) Appl. No.: 15/003,051

(22) Filed: Jan. 21, 2016

(65) Prior Publication Data

US 2017/0209001 A1     Jul. 27, 2017

(51) Int. Cl.
*A47J 43/14*     (2006.01)

(52) U.S. Cl.
CPC ....................... *A47J 43/14* (2013.01)

(58) Field of Classification Search
None
See application file for complete search history.

(56) References Cited

U.S. PATENT DOCUMENTS

| | | | |
|---|---|---|---|
| 2,018,162 A | | 10/1935 | Weldon |
| 2,823,715 A | * | 2/1958 | Quave .................... A47J 43/14 99/577 |
| 2,827,936 A | * | 3/1958 | Furphy ................... A47J 43/14 99/568 |
| 5,457,827 A | * | 10/1995 | Johnson .................. A47K 5/02 206/77.1 |
| 6,095,038 A | * | 8/2000 | Cerro ....................... A23J 1/09 99/497 |
| 6,915,735 B1 | * | 7/2005 | So ........................... A47J 43/14 99/497 |
| 8,695,838 B1 | | 4/2014 | Montgomery |
| 2007/0029333 A1 | * | 2/2007 | Dua ........................ A47J 36/06 220/628 |
| 2008/0017049 A1 | | 1/2008 | O'Connor |
| 2008/0149634 A1 | | 6/2008 | Osborne |
| 2008/0308566 A1 | * | 12/2008 | Fierek ..................... B25H 3/00 220/735 |

(Continued)

OTHER PUBLICATIONS

15 Cool Salad Bowls and Creative Salad Server Designs; http://www.crookedbrains.net/2012/01/cool-salad-bowls-creative-salad-servers.html, [retrieved on Jan. 21, 2016]; 10 pages.

(Continued)

*Primary Examiner* — David Angwin
*Assistant Examiner* — Spencer h Kirkwood
(74) *Attorney, Agent, or Firm* — Pillsbury Winthrop Shaw Pittman, LLP

(57) ABSTRACT

The present disclosure relates to an egg preparation apparatus. Exemplary implementations may facilitate preparing eggs by using one or more of a platform, a first container, a first container mount, a second container, a second container mount, an egg scorer, an egg scorer mount, a scoring edge, a storage compartment, a slide-out drawer, an egg separator, one or more platform attachment mounts, and/or other components. The platform may be configured to removably couple with one or more of a first container, a second container, and/or an egg scorer. The first container may be configured to receive one or more of egg whites, egg yolks, and/or other ingredients. The second container may be configured to receive one or more egg shells and/or other waste. The egg scorer may be configured to facilitate one or more of cutting, scoring, cracking, and/or other methods of opening egg shells.

20 Claims, 32 Drawing Sheets

(56) References Cited

U.S. PATENT DOCUMENTS

2009/0134751 A1*  5/2009  Ingjaldsdottir ........ A47B 77/02
                                                    312/237
2014/0116413 A1*  5/2014  Brown ...................... A45F 3/46
                                                    126/276

OTHER PUBLICATIONS

Amazon.com: Egg Cracker; http://www.amazon.com/Dojo-Chef-2083-Egg-Cracker/dp/B001MSYCLC, [retrieved on Jan. 21, 2016]; 2 pages.

* cited by examiner

| EGG PREPARATION APPARATUS | — 100 |
|---|---|
| First Container | — 102 |
| First Container Mount | — 110 |
| Egg Separator | — 112 |
| Hole | — 114 |
| Trough | — 116 |
| Aperture(s) | — 118 |
| Lifting Tab | — 120 |
| Second Container | — 104 |
| Second Container Mount | — 122 |
| Second Container Interior Wall | — 126 |
| Second Container Pocket | — 124 |
| Sidewall(s) | — 128 |
| Internal Ledge | — 130 |
| Drain | — 132 |
| Second Container Base | — 134 |
| Brim | — 136 |
| Egg Scorer | — 106 |
| Scoring edge | — 138 |
| Handgrip | — 140 |
| Egg Scorer Mount | — 142 |
| Platform | — 108 |
| Platform First Side | — 144 |
| Platform Second Side | — 146 |
| Non-Skid Surface | — 148 |
| Storage Compartment | — 150 |
| Slide-Out Drawer | — 152 |
| Drawer Slides | — 154 |
| First Platform Attachment Mount | — 156 |
| Second Platform Attachment Mount | — 158 |
| Third Platform Attachment Mount | — 160 |

FIG. 1

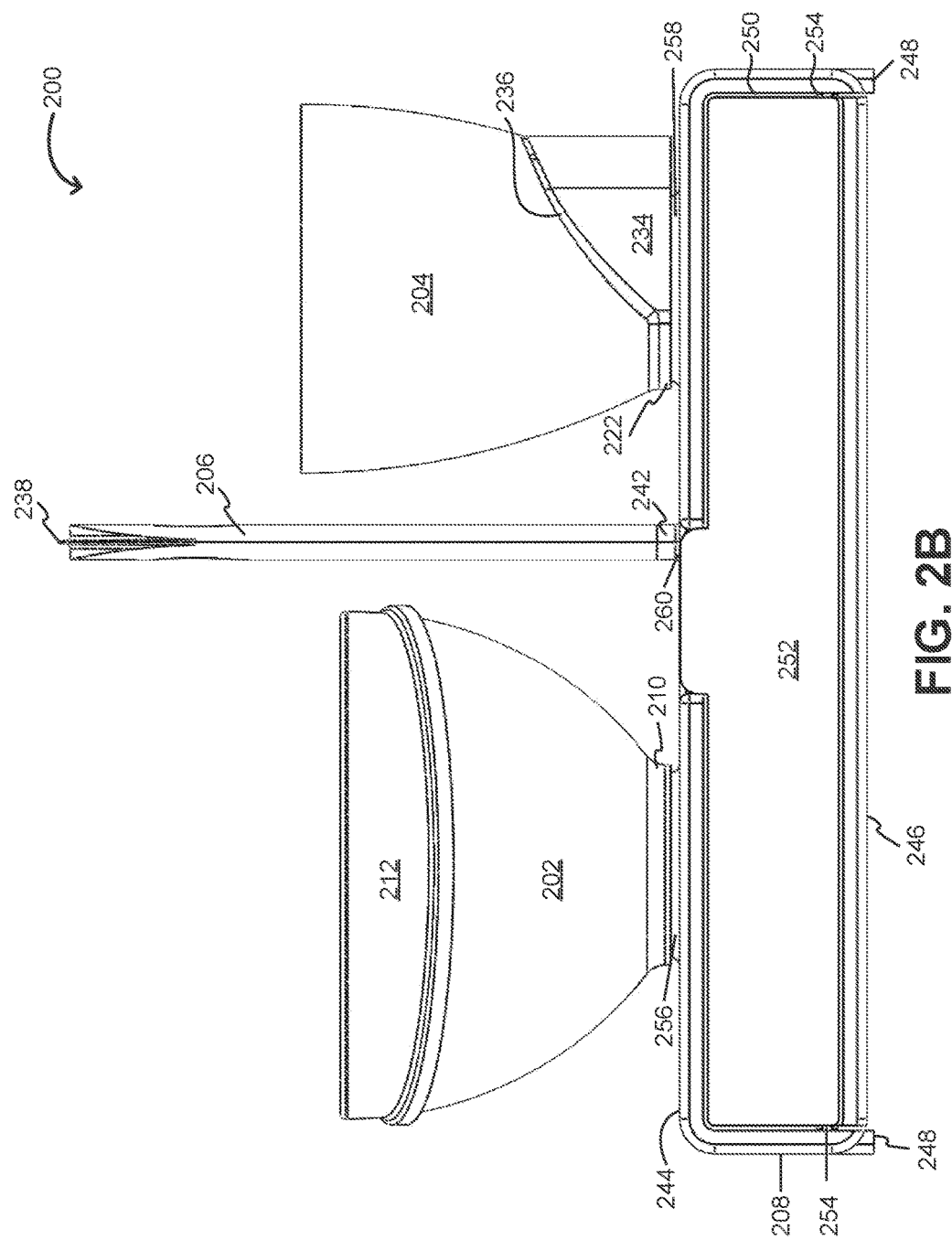

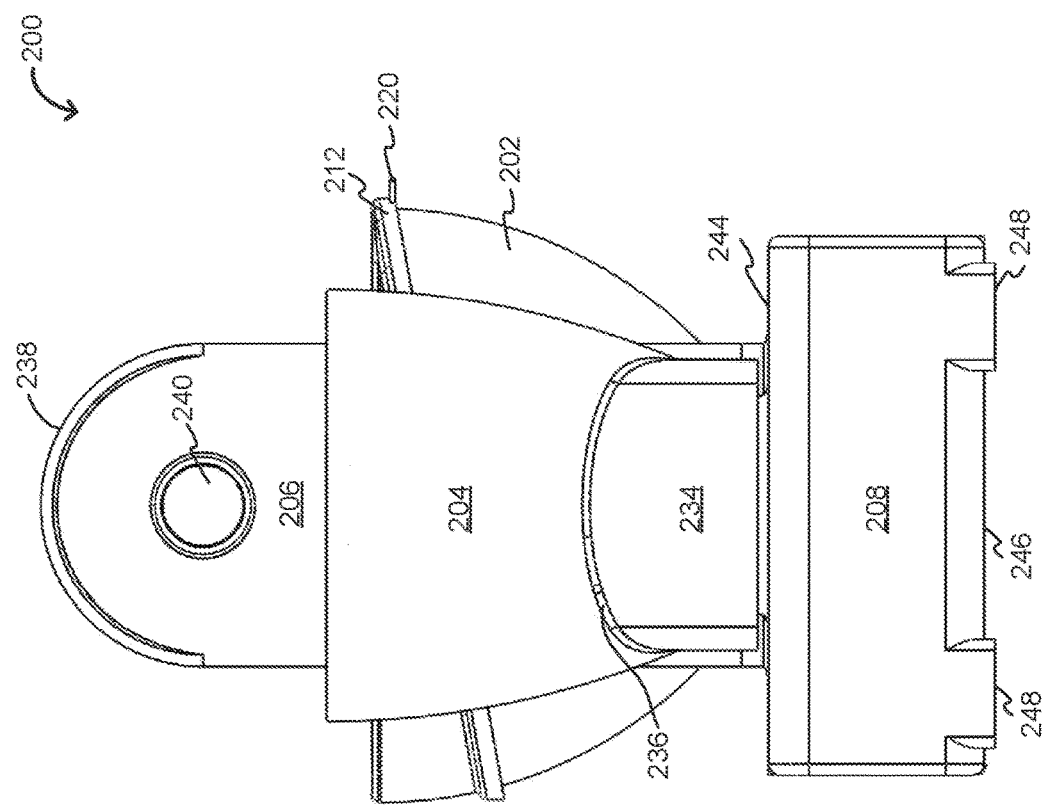

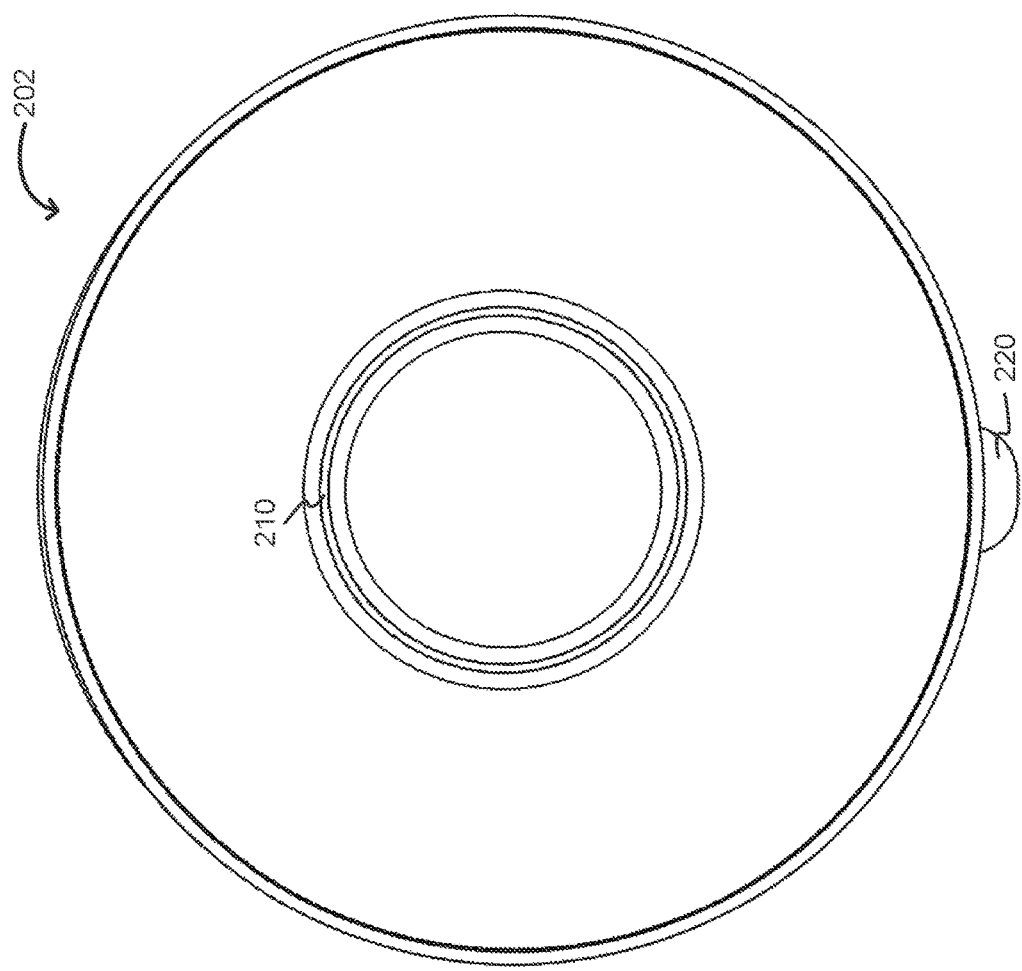

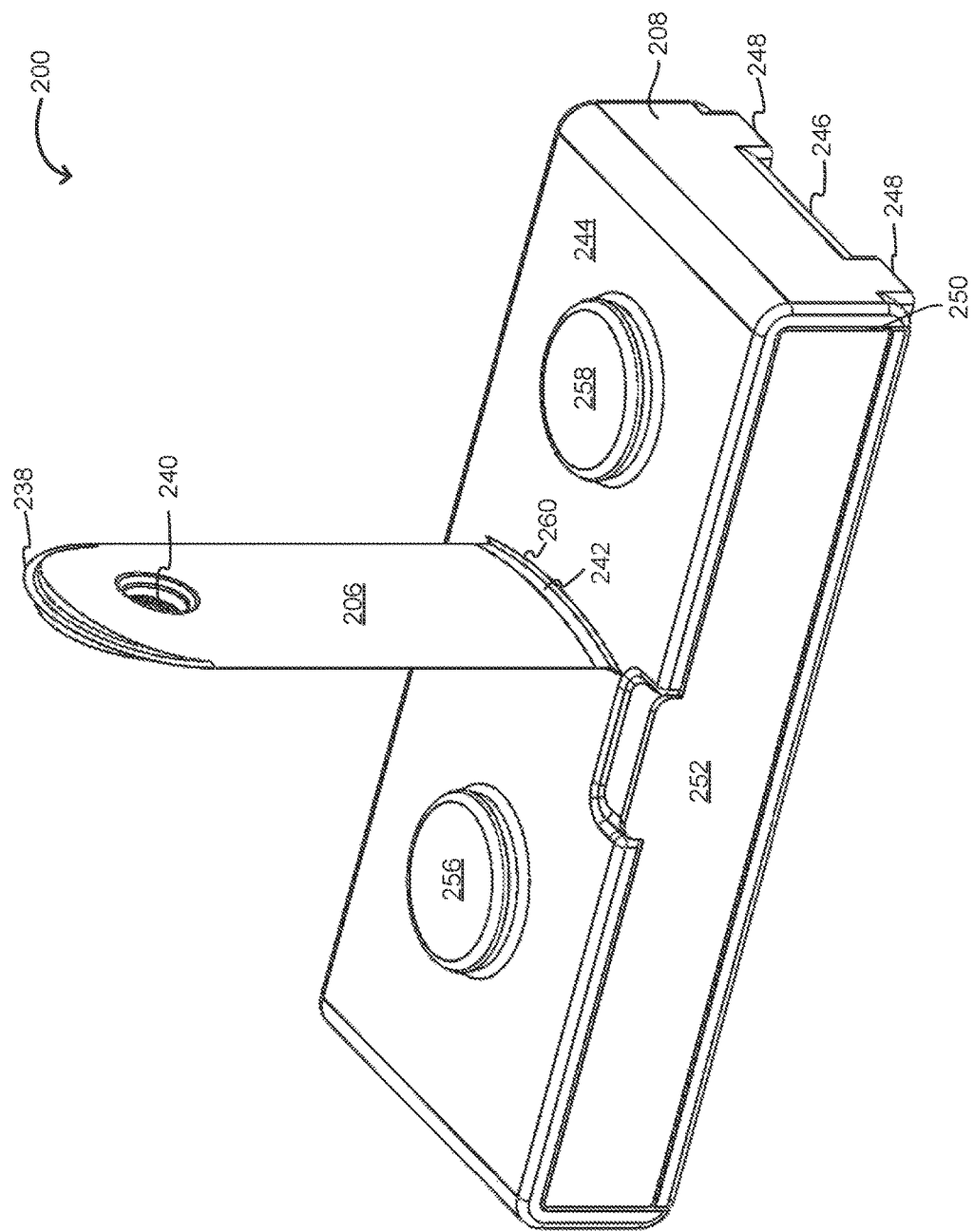

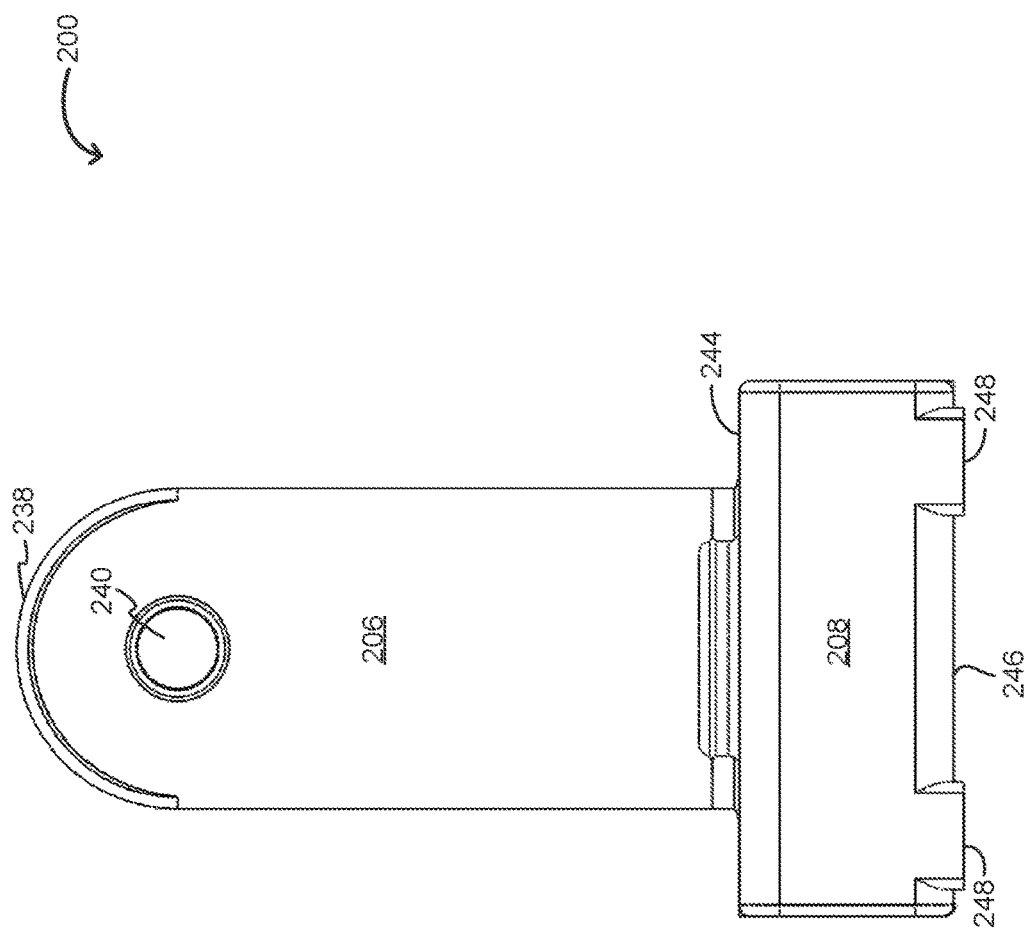

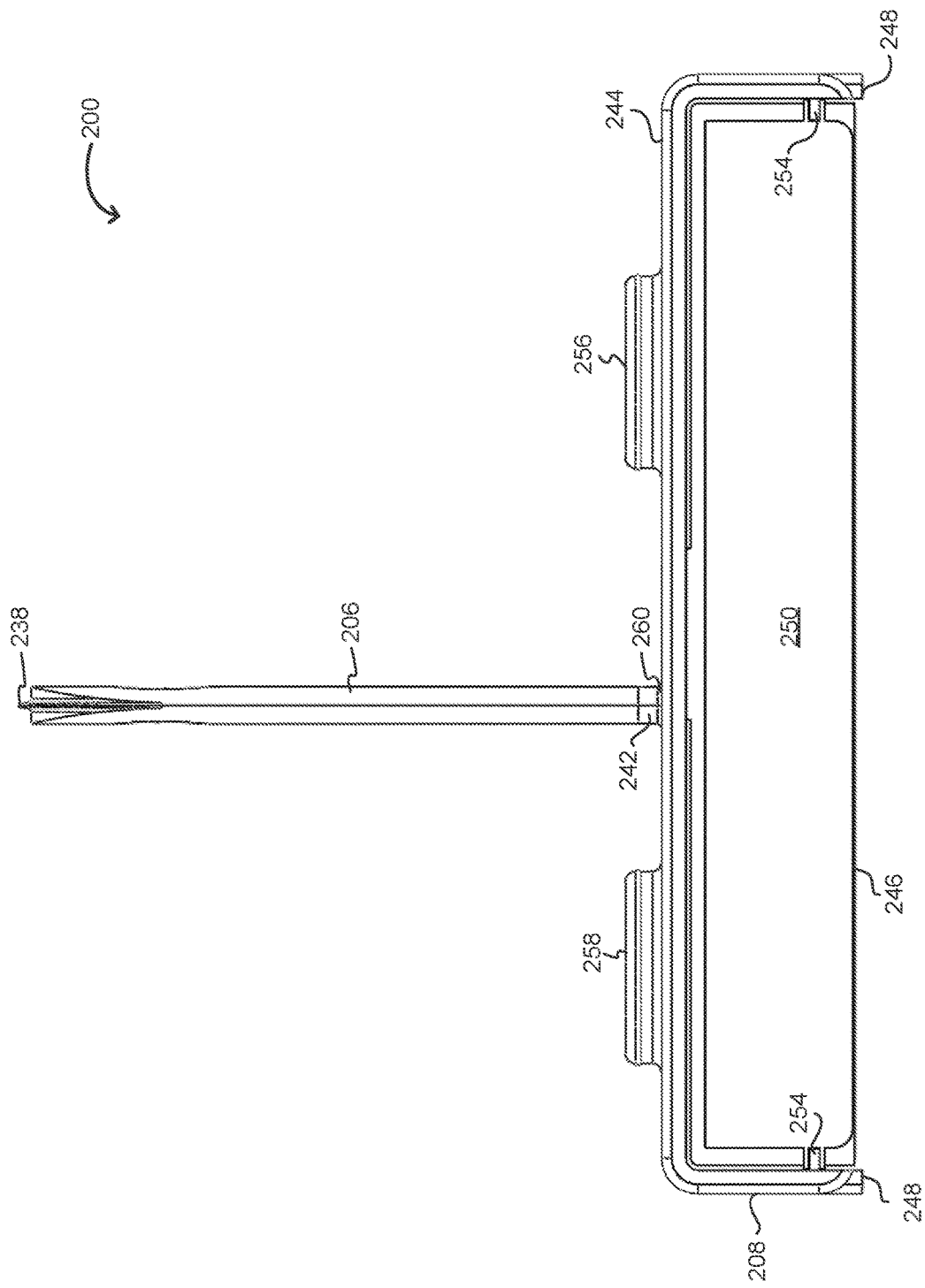

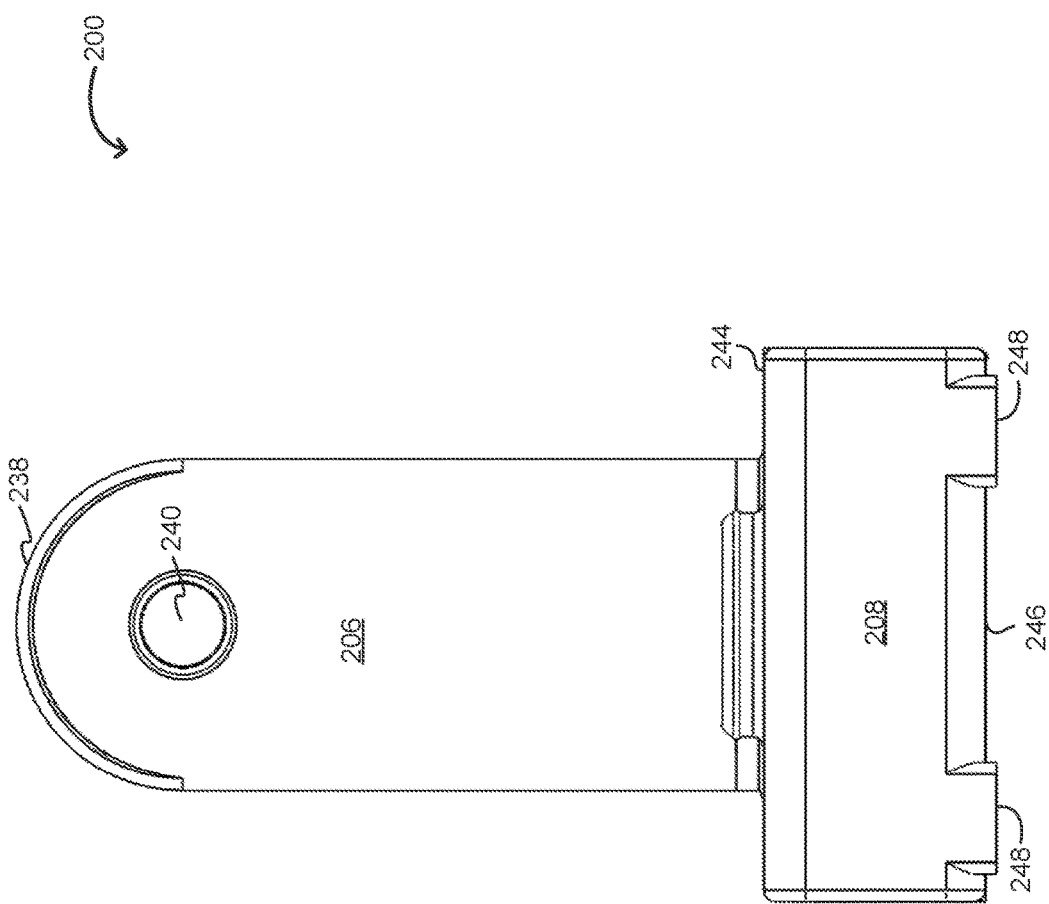

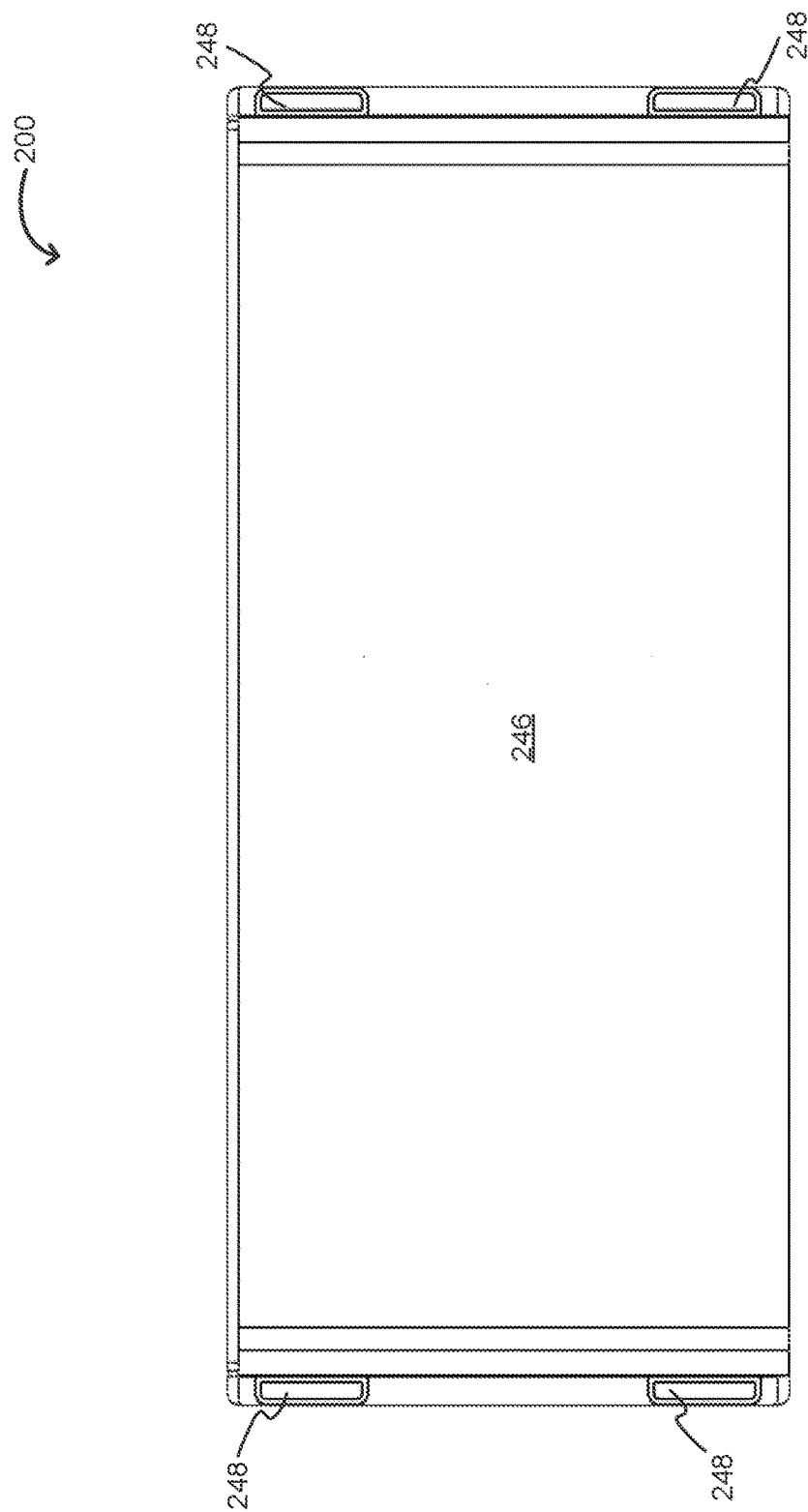

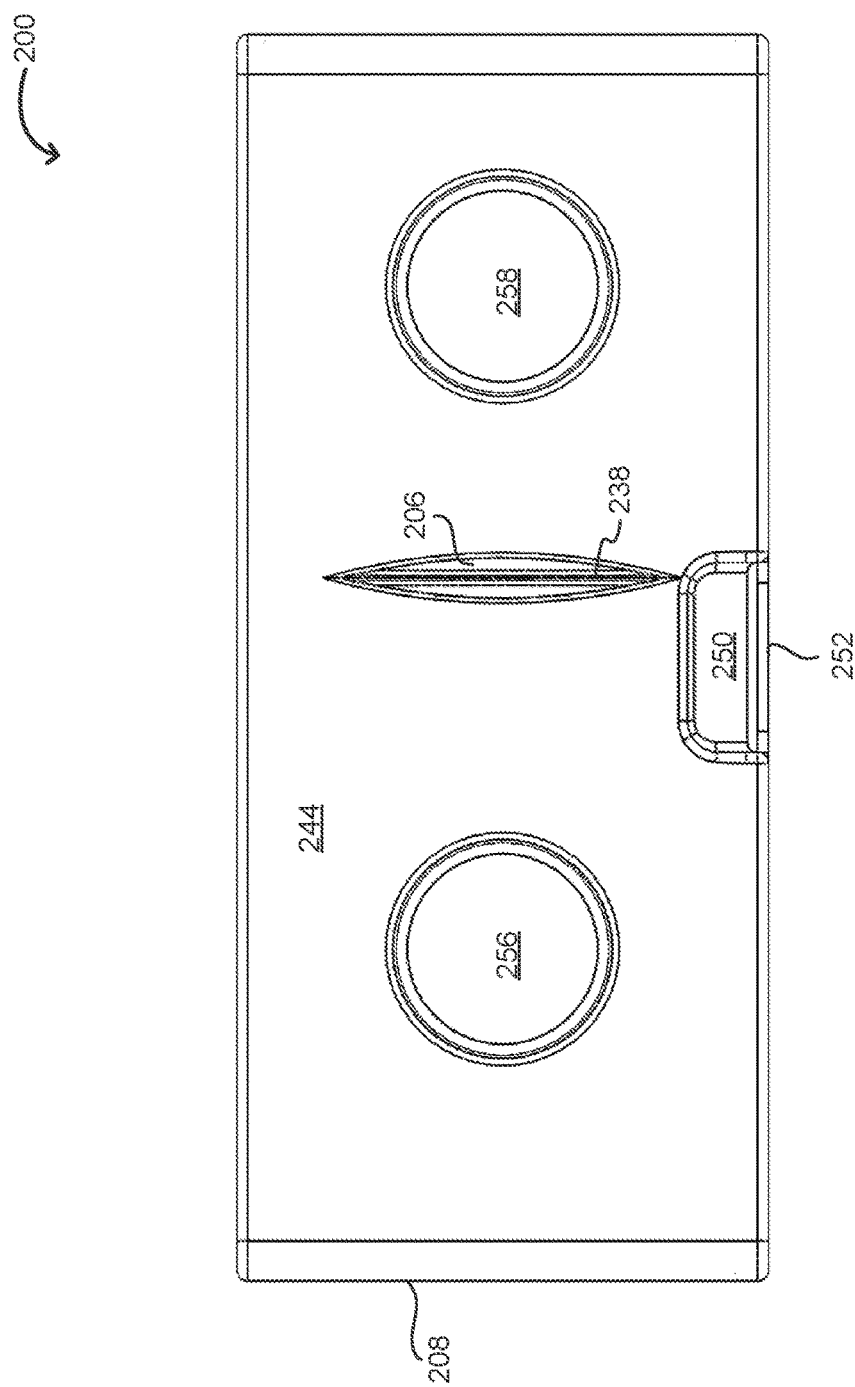

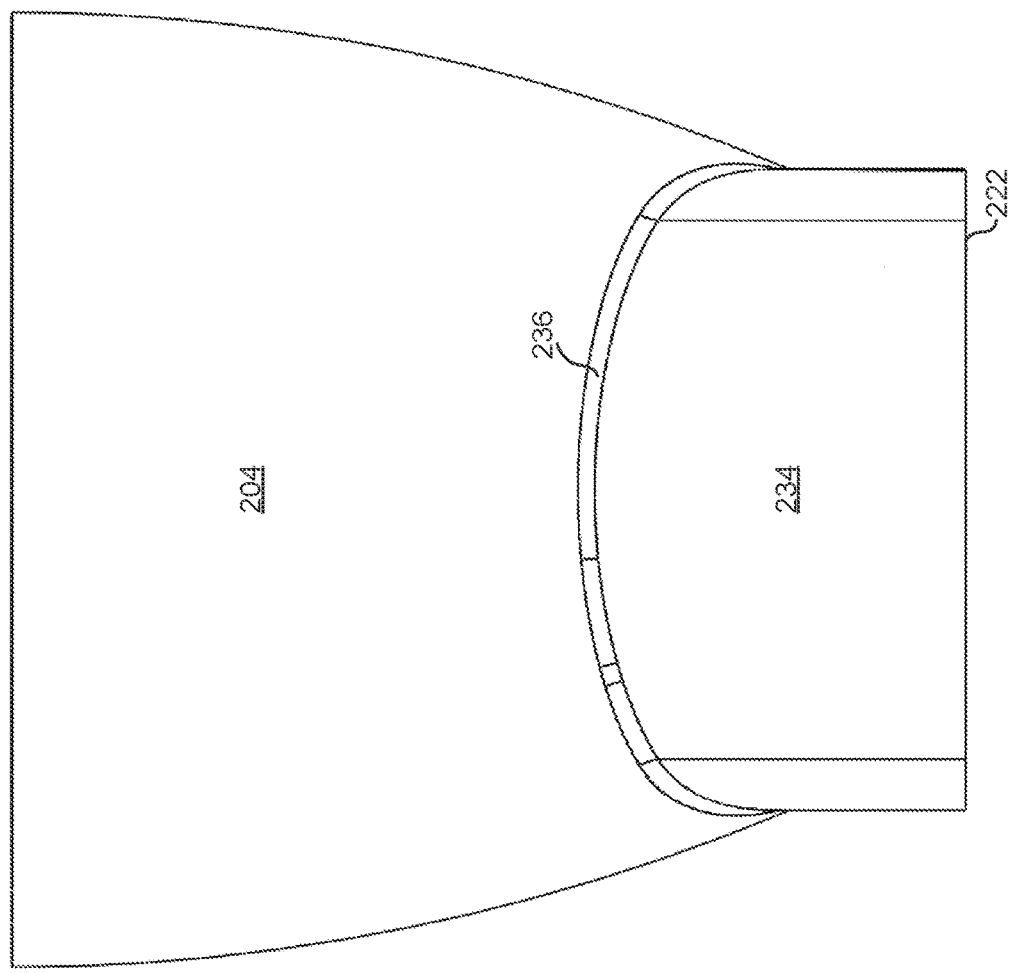

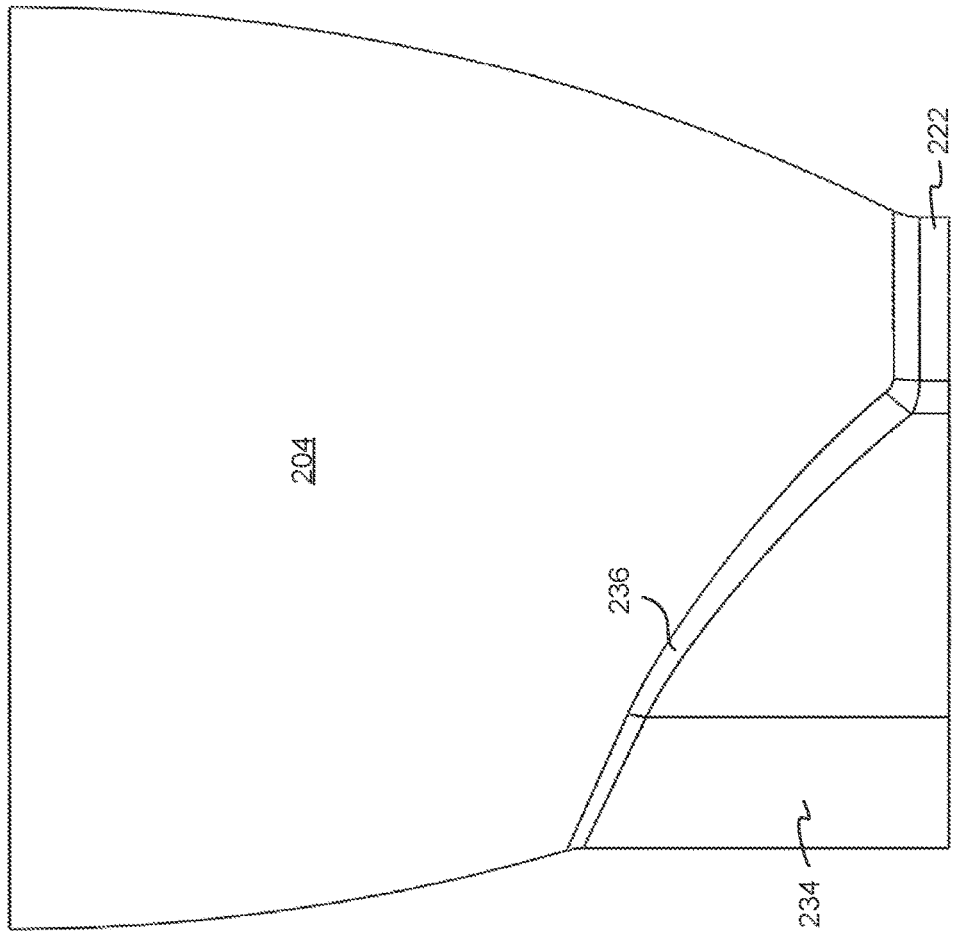

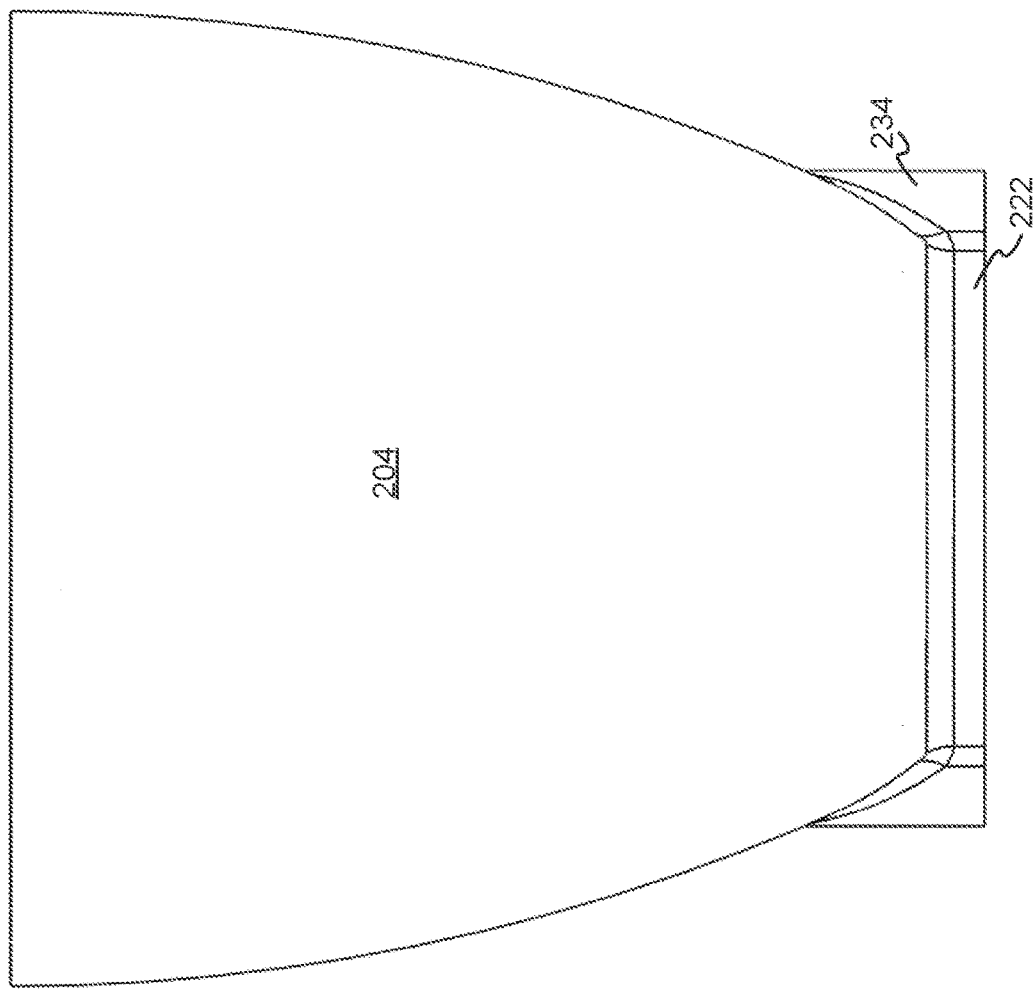

APPARATUS FOR PREPARING EGGS

FIELD OF THE DISCLOSURE

The present disclosure relates to apparatus configured for preparing eggs.

BACKGROUND

Foodborne illness, often referred to as "food poisoning" may be caused by *Salmonella*, a type of bacterium. In the past few years, large outbreaks of illness caused by *Salmonella*-contaminated eggs have made the headlines. Although many other foodborne illnesses have declined in the past 15 years, *Salmonella* infections have not declined at all. A new *CDC Vital Signs* report on making our food safer to eat focuses on reducing contamination from *Salmonella*. Improper preparation of food may increase the likelihood of food poisoning. The U.S. Food and Drug Administration emphasizes the importance of keeping everything clean by washing hands, utensils, equipment, and work surfaces with hot, soapy water before and after they come in contact with eggs and egg-containing foods. To kill most of the bacteria on a dirty dish or countertop, water must reach a scalding 140° Fahrenheit. That temperature may be easily reached in a dishwasher, but in a sink, it may be nearly impossible. Chemical cleaning products such as bleach may kill bacteria found on countertops, however, such cleansers may cause irritation to the skin and lungs or pose an ingestion hazard to homes with pets and children.

Conventional containers and devices for egg preparation are typically standalone and require being used in conjunction with other various kitchen accessories not specifically designed to be used together. For example, an egg separator may require being manually held over a cup or other container. Manually holding the egg separator with one hand while trying to crack an egg into it with the other hand or placing the egg separator over an improperly sized container, may lead to egg contaminant on countertops or other utensils. Similarly, cracking an egg into a container then moving the eggshell across a work surface to the waste may also cause contamination from egg residue.

SUMMARY

One or more aspects of the disclosure relate to an egg preparation apparatus. An all-inclusive and dishwasher-safe apparatus for preparing eggs may reduce the possibility of harmful bacterial growth caused by egg contamination. According to exemplary implementations, the egg preparation apparatus may facilitate cracking open an egg, discarding the egg shell, separating the egg yolk from egg white, and/or providing storage for utensils as well as egg preparation apparatus accessories. Egg preparation apparatus accessories may include one or more of a first container, a second container, an egg scorer, and/or other accessories. The accessories may be secured to a platform. The platform may provide a continuous work surface, such that any egg residue may remain on the platform or on the other accessories. The platform, first container, second container, egg scorer, and/or other accessories may be compatible with being washed via dishwasher and configured to be disassembled for dishwasher washing.

The platform may include a platform first side opposite from a platform second side. The platform first side may be a top side of the platform during use. The platform may include one or more platform attachment mounts disposed on the platform first side. The one or more platform attachment mounts may include a first platform attachment mount, a second platform attachment mount, a third platform attachment mount, and/or other attachment mounts. The first container may be configured to be removably coupled with the first platform attachment mount by way of a first container mount disposed on an external surface of the first container. The first container may be configured to receive one or more of egg whites, egg yolks, and/or other ingredients via an opening of the first container. The second container may be configured to be removably coupled with the second platform attachment mount by way of a second container mount disposed on an external surface of the second container. The second container may be configured to receive one or more egg shells via an opening of the second container. The egg scorer may be configured to be removably coupled with the third platform attachment mount by way of an egg scorer mount disposed on an external surface of the egg scorer. The egg scorer may be configured to facilitate one or more of cutting, scoring, cracking, and/or other methods of opening egg shells.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 1 illustrates an egg preparation apparatus, in accordance with one or more implementations.

FIG. 2B illustrates a first side view of an exemplary implementation of an egg preparation apparatus.

FIG. 2C illustrates a second side view of an exemplary implementation of an egg preparation apparatus.

FIG. 3G illustrates a bottom view of an exemplary implementation of a first container.

FIG. 4B illustrates a perspective view from above, a first side, and a second side of an exemplary implementation of an egg preparation apparatus.

FIG. 4D illustrates a second side view of an exemplary implementation of an egg preparation apparatus.

FIG. 4E illustrates a third side view of an exemplary implementation of an egg preparation apparatus.

FIG. 4F illustrates a fourth side view of an exemplary implementation of an egg preparation apparatus.

FIG. 4G illustrates a bottom view of an exemplary implementation of an egg preparation apparatus.

FIG. 4H illustrates a top view of an exemplary implementation of an egg preparation apparatus.

FIG. 5D illustrates a second side view of an exemplary implementation of a second container.

FIG. 5E illustrates a third side view of an exemplary implementation of a second container.

FIG. 5F illustrates a fourth side view of an exemplary implementation of a second container.

DETAILED DESCRIPTION

Figure 2A:
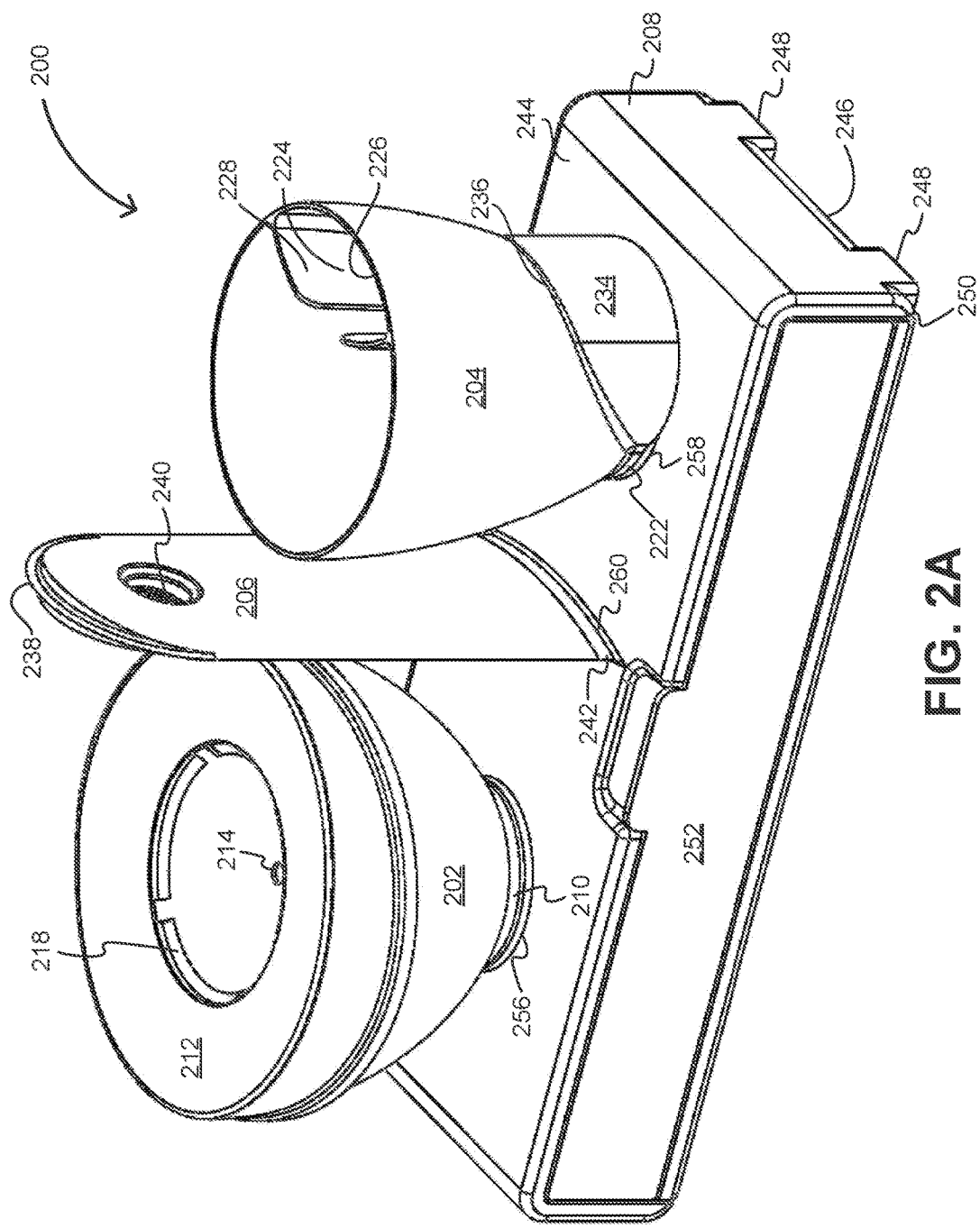
FIG. 2A illustrates a perspective view from above, a first side, and a second side of an exemplary implementation of an egg preparation apparatus.

FIG. 1 illustrates an egg preparation apparatus 100, in accordance with one or more implementations. In some implementations, egg preparation apparatus 100 may include one or more of a first container 102, a second container 104, an egg scorer 106, a platform 108, and/or other components.

In some implementations, the first container 102 may be configured to receive one or more of egg whites, egg yolks, and/or other ingredients via an opening of the first container 102. The opening of the first container 102 may be a top side of the first container 102 during use. Opposite to the opening of the first container 102 may be a bottom side of the first container 102 during use. In some implementations, the first container 102 may be bowl shaped. The footprint of the first container 102 may be shaped as one or more of a circle, a square, a rectangle, a polygon, an ellipse, and/or other shapes. In some implementations, the circle diameter at the opening of the first container 102 may be larger than the cross-sectional circle diameter proximate to the bottom side of the first container 102. The first container 102 may have a containment volume in a range between about 100 milliliters and about two liters, inclusive (e.g., 100 mL, 200 mL, 300 mL, 400 mL, 500 mL, 600 mL, 700 mL, 800 mL, 900 mL, 1 L, 1.1 L, 1.2 L, 1.3 L, 1.4 L, 1.5 L, 1.6 L, 1.7 L, 1.8 L, 1.9 L, 2 L, and/or other volumes). By way of non-limiting example, the first container 102 may be configured to facilitate the mixing, blending, stirring, whipping, and/or other methods of preparing eggs and/or other food ingredients. By way of non-limiting example, the first container 102 may be a mixing bowl.

The first container 102 may be configured to removably couple with the platform 108. In some implementations, the first container 102 may include a first container mount 110. The first container mount 110 may facilitate removably coupling the first container 102 with the platform 108. The first container mount 110 may be disposed on an external surface of the first container 102 opposite to the opening of the first container 102. By way of non-limiting example, the first container mount 110 may be disposed on the bottom side of the first container 102.

In some implementations, the first container 102 may include an egg separator 112 and/or other components. The egg separator 112 may be configured to facilitate separating egg yolks from egg whites. By way of non-limiting example, the egg separator 112 may be concave shaped. In some implementations, the egg separator 112 may include a hole 114 disposed at a trough 116 of the concave. The egg separator 112 may be configured such that egg whites are allowed to pass through the hole 114 and egg yolks are retained in the trough 116. In some implementations, the egg separator 112 may include one or more apertures 118 disposed around the concave of the egg separator 112. By way of non-limiting example, the one or more apertures 118 may also allow egg whites to pass into the first container 102 while retaining the egg yolks in the trough 116. In some implementations, the egg separator 112 may be configured to removably couple with the opening of the first container 102. In some implementations, the egg separator 112 may be fitted to the first container 102 such that the egg separator 112 may releasably couple adjacent to a rim of the first container 102. In some implementations, the egg separator 112 may include a lifting tab 120 configured to facilitate lifting and releasing the egg separator 112 from the rim of the first container 102.

In some implementations, the second container 104 may be configured to receive one or more egg shells via an opening of the second container 104. The opening of the second container 104 may be a top side of the second container 104 during use. Opposite to the opening of the second container 104 may be a bottom side of the second container 104 during use. By way of non-limiting example, the second container 104 may be bowl shaped. The footprint of the second container 104 may be shaped as one or more of a circle, a square, a rectangle, a polygon, an ellipse, and/or other shapes. In some implementations, the circle diameter at the opening of the second container 104 may be larger than the cross-sectional circle diameter proximate to the bottom side of the second container 104. The second container 104 may have a containment volume in a range between about 100 milliliters and about one liter, inclusive (e.g., 100 mL, 200 mL, 300 mL, 400 mL, 500 mL, 600 mL, 700 mL, 800 mL, 900 mL, 1 L, and/or other volumes). By way of non-limiting example, the second container 104 may be configured for temporarily retaining egg shells, scraps, packaging, peels, and/or other ingredient waste until the waste may be permanently discarded. By way of non-limiting example, the second container 104 may be a waste bowl.

The second container 104 may be configured to removably couple with the platform 108. In some implementations, the second container 104 may include a second container mount 122. The second container mount 122 may facilitate removably coupling the second container 104 with the platform 108. The second container mount 122 may be disposed on an external surface of the second container 104 opposite to the opening of the second container 104. By way of non-limiting example, the second container mount 122 may be disposed on the bottom side of the second container 104.

In some implementations, the second container 104 may include a second container pocket 124 and/or other components. The second container pocket 124 may be configured to receive utensils used for mixing eggs via an opening of the second container pocket 124. The opening of the second container pocket 124 may be a top side of the second container pocket 124 during use. In some implementations, the second container pocket 124 may be disposed within the second container 104 such that the second container pocket 124 opening may be disposed proximate to the opening of the second container 104. In some implementations, the top side of the second container 104 and the top side of the second container pocket 124 may be the same side. In some implementations, the second container pocket 124 may be formed by a shared portion of a second container interior wall 126. In some implementations, the second container pocket 124 may include one or more sidewalls 128. The one or more sidewalls 128 may extend from the second container interior wall 126 toward the center of the second container 104. The one or more sidewalls 128 may be disposed opposite to the shared portion of the second container interior wall 126. In some implementations, the one or more sidewalls 128 may include a slot extending from the top side of the second container pocket 124 toward the bottom side of the second container 104. The slot may be configured to accommodate variously shaped utensils. In some implementations, an internal ledge 130 may be disposed within the second container pocket 124. The internal ledge 130 may extend from the second container interior wall 126 and meet at the one or more sidewalls 128 of the second container pocket 124. In some implementations, the internal ledge 130 of the second container pocket 124 may include a drain 132. The drain 132 may be configured to allow egg residue on the utensils to flow out of the second container pocket 124. The second container pocket 124 may be sized to accommodate one or more utensils. By way of non-limiting example, the second container pocket 124 may be configured to retain one or more soiled utensils containing egg residue.

In some implementations, the second container 104 may include a second container base 134. The second container base 134 may be disposed on an external surface of the second container 104 opposite to the opening of the second container 104. By way of non-limiting example, the second container base 134 may be disposed between the internal ledge 130 of the second container pocket 124 and the second container mount 122. The second container base 134 may have a flat surface disposed on a first external side adjacent to the second container pocket 124. By way of non-limiting example, in some implementations the flat surface of the second container base 134 may be about perpendicular to the bottom side of the second container 104. The second container base 134 may include a brim 136 with curvature conforming to the external structure of the second container 104.

In some implementations, the egg scorer 106 may be configured to facilitate one or more of cutting, scoring, cracking, and/or other methods of opening egg shells. In some implementations, the egg scorer 106 may include a scoring edge 138. The scoring edge 138 of the egg scorer 106 may be a top side of the egg scorer 106 during use. Opposite to the scoring edge 138 of the egg scorer 106 may be a bottom side of the egg scorer 106 during use. In some implementations, the scoring edge 138 may be disposed in a slot at a peak of the egg scorer 106. The scoring edge 138 may protrude out from the slot of the egg scorer 106. The scoring edge 138 may be configured to be removable from the egg scorer 106. Such removability may facilitate storing, cleaning, and/or replacing the scoring edge 138. By way of non-limiting example, the scoring edge 138 may be one or more of a blade, a knife, a blunt or flat surface, and/or another surface with thickness in a range of about half a millimeter to about 10 millimeters, inclusive (e.g., 0.5 mm, 1 mm, 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, and/or other thicknesses). In some implementations, the scoring edge 138 may be disposed on a pedestal. The pedestal may include a handgrip 140 configured to facilitate manually moving the apparatus. By way of non-limiting example, the handgrip 140 may include one or more of an aperture through the pedestal, a handle, a knob, and/or other part configured to facilitate manually moving the apparatus. The egg scorer 106 may be configured to removably couple with the platform 108. In some implementations, the egg scorer 106 may include an egg scorer mount 142. The egg scorer mount 142 may facilitate removably coupling the egg scorer 106 with the platform 108. The egg scorer mount 142 may be disposed on an external surface of the egg scorer 106 opposite to the scoring edge 138 of the egg scorer 106. By way of non-limiting example, the egg scorer mount 142 may be disposed on the bottom side of the egg scorer 106.

In some implementations, the platform 108 may be configured to provide a work surface for egg preparation. The platform 108 may be configured to removably couple with one or more of the first container 102, the second container 104, the egg scorer 106, and/or other components. In some implementations, the platform 108 may be fixed to one or more of the first container 102, the second container 104, the egg scorer 106, and/or other components. In some implementations, the platform 108 may include a platform first side 144 opposite from a platform second side 146. The platform first side 144 may be a top side of the platform 108 during use. A footprint of the platform 108 may be shaped as one or more of a square, a rectangle, a circle, a polygon, an ellipse, and/or other shapes. The footprint of the platform 108 may have a width in a range of about 15 centimeters to about 40 centimeters, inclusive (e.g., 15 cm, 20 cm, 25 cm, 30 cm, 35 cm, 40 cm, and/or other widths). The footprint of the platform 108 may have a length in a range of about 30 centimeters to about 70 centimeters, inclusive (e.g., 30 cm, 35 cm, 40 cm, 45 cm, 50 cm, 55 cm, 60 cm, 65 cm, 70 cm, and/or other lengths). The platform 108 may have a height in a range of about 5 centimeters to about 20 centimeters, inclusive (e.g., 5 cm, 10 cm, 15 cm, 20 cm, and/or other heights).

In some implementations, the platform 108 may include a non-skid surface 148 disposed on the platform second side 146. The non-skid surface 148 may be configured to maintain the position of the platform 108 on a working surface. The working surface may be a countertop or other support surface. By way of non-limiting example, the non-skid surface 148 may include one or more of tape, tread, coating, rubber, silicone, adhesive, epoxy, and/or other non-skid materials.

In some implementations, the platform 108 may include a storage compartment 150. The storage compartment 150 may be disposed within the platform 108 between the platform first side 144 and the platform second side 146. The storage compartment 150 may be configured to store one or more of the first container 102, the second container 104, the egg scorer 106, utensils, and/or other accessories. In some implementations, the storage compartment 150 may have a containment volume in a range between about two liters and about 30 liters, inclusive (e.g., 2 L, 3 L, 4 L, 5 L, 6 L, 7 L, 8 L, 9 L, 10 L, 11 L, 12 L, 13 L, 14 L, 15 L, 16 L, 17 L, 18 L, 19 L, 20 L, 21 L, 22 L, 23 L, 24 L, 25 L, 26 L, 27 L, 28 L, 29 L, 30 L, and/or other volumes).

In some implementations, the storage compartment 150 may be accessible via a slide-out drawer 152. The slide-out drawer 152 may provide access to within the storage compartment 150. By way of non-limiting example, the slide-out drawer 152 may be mounted via one or more drawer slides 154 disposed on two opposing internal surfaces of the platform 108.

The platform 108 may include one or more platform 108 attachment mounts disposed on the platform first side 144. The one or more platform 108 attachment mounts may include a first platform attachment mount 156, a second platform attachment mount 158, and a third platform attachment mount 160. In some implementations, the first platform attachment mount 156, the second platform attachment mount 158, and the third platform attachment mount 160 may removably couple, respectively, with the first container mount 110, the second container mount 122, and the egg scorer mount 142. By way of non-limiting example, one or more mounts may be configured to couple by one or more of a twist-lock, a twist-lock teeth, a snap-in teeth, a press-fit, a clamp, a latch, suction cups, magnets, and/or other coupling mechanism.

One or more of the platform 108, the first container 102, the second container 104, the egg scorer 106, and/or other accessories may be formed of one or more of plastic, rubber, copper, stainless steel, polymer, metal, wood, ceramics, plywood, aluminum, fiberglass, carbon fiber, laminate, and/or other materials such that in some implementations, the platform 108, the first container 102, the second container 104, and the egg scorer 106 may be compatible with being washed via dishwasher and configured to be disassembled for dishwasher washing.

Figure 2D:
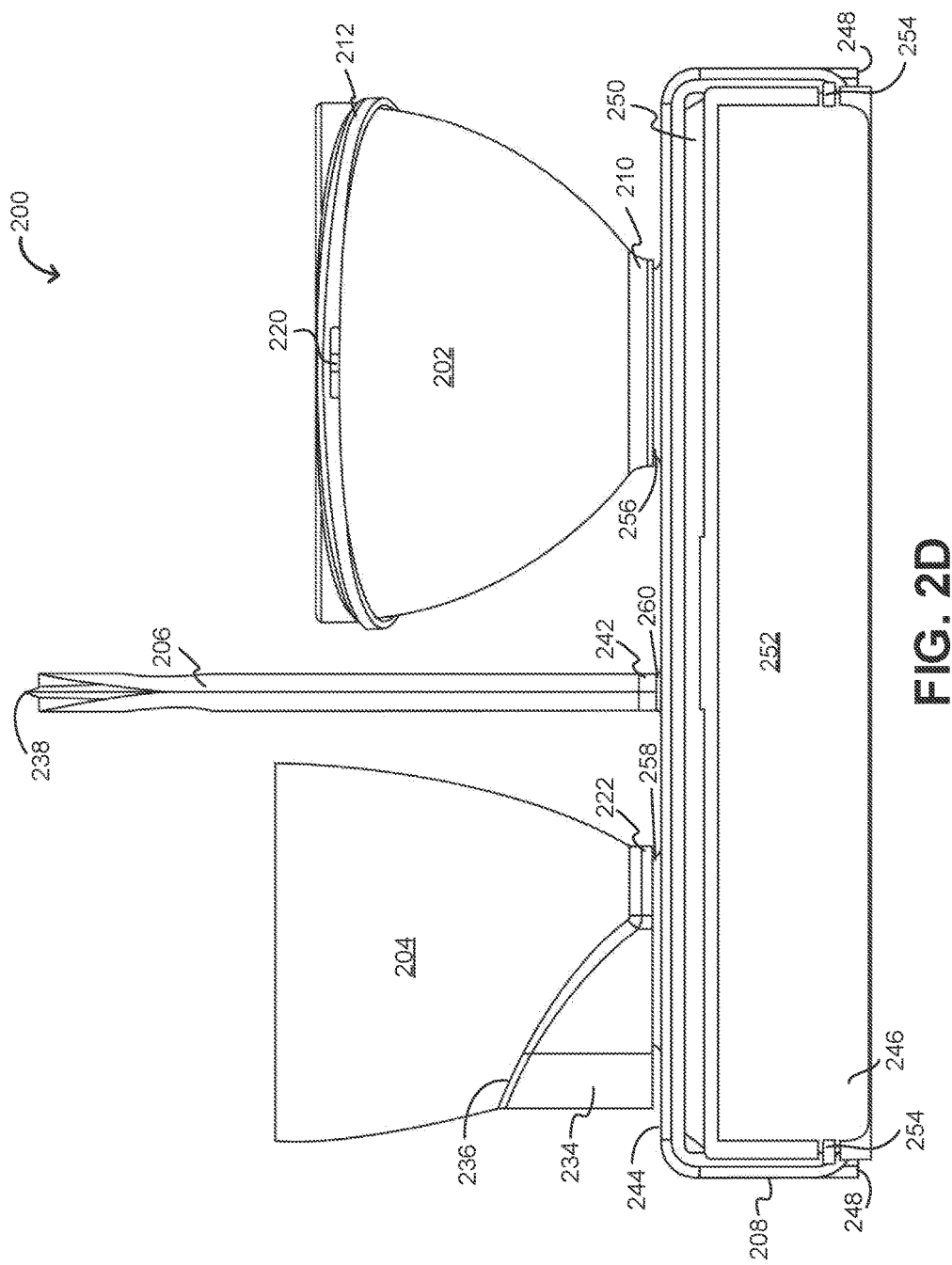
FIG. 2D illustrates a third side view of an exemplary implementation of an egg preparation apparatus.
Figure 2E:
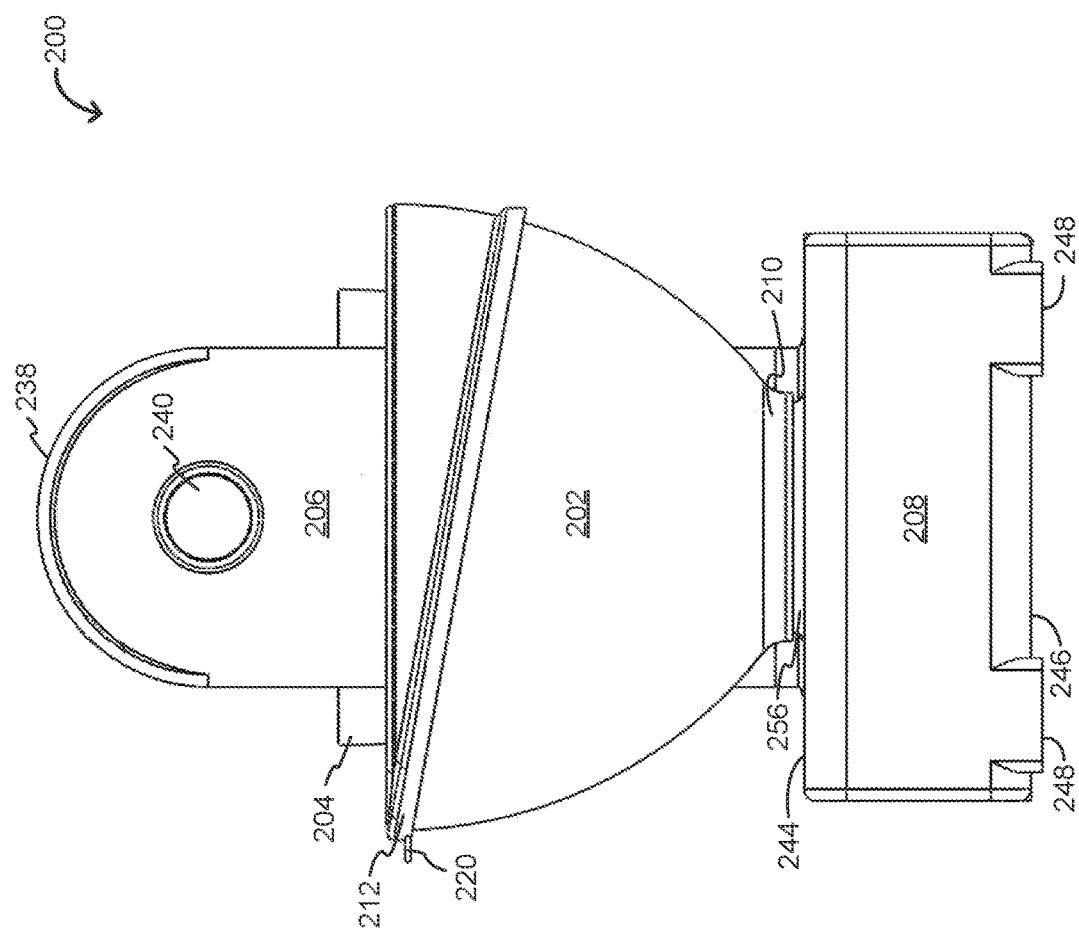
FIG. 2E illustrates a fourth side view of an exemplary implementation of an egg preparation apparatus.
Figure 2F:
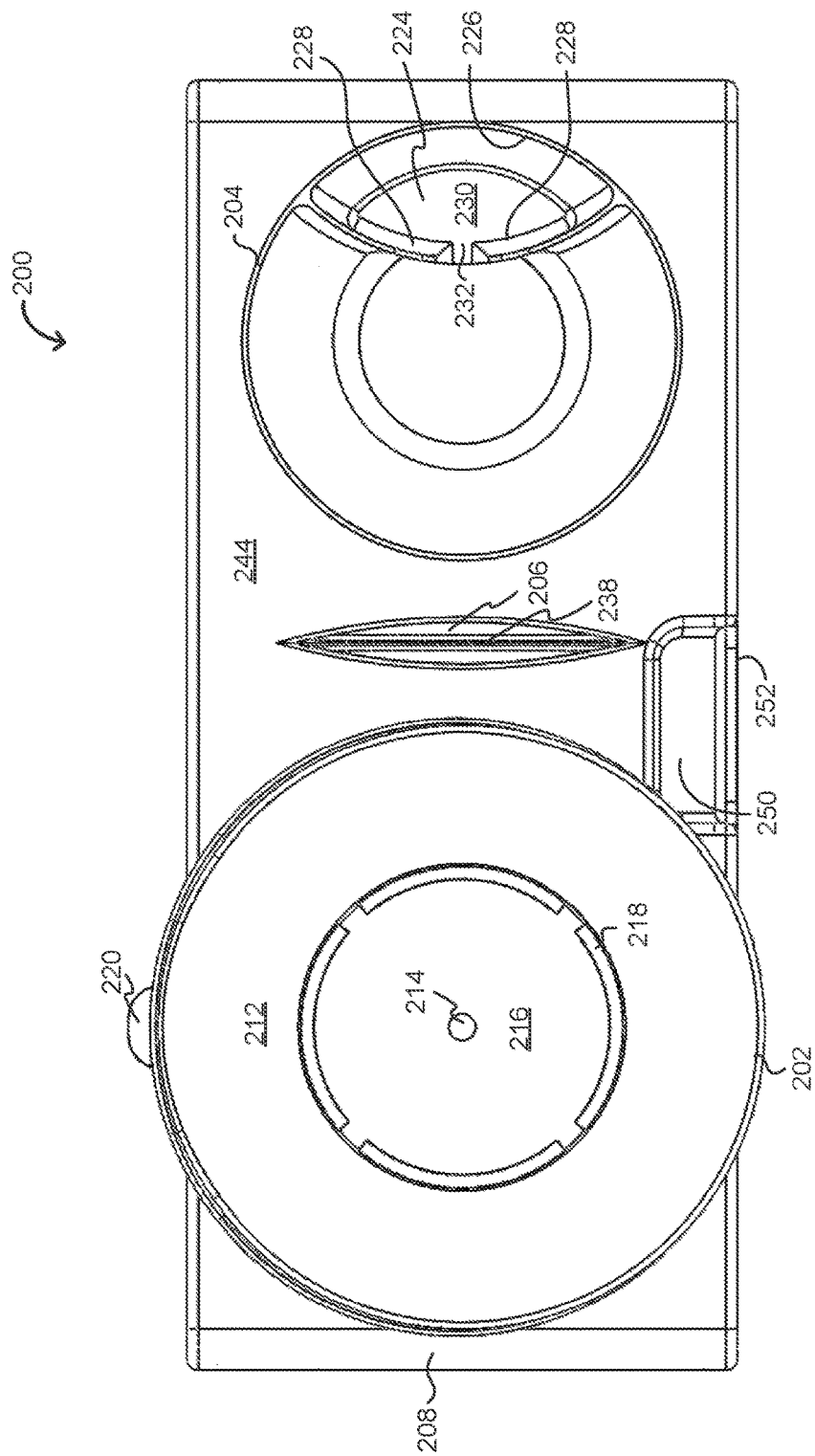
FIG. 2F illustrates a top view of an exemplary implementation of an egg preparation apparatus.
Figure 2G:
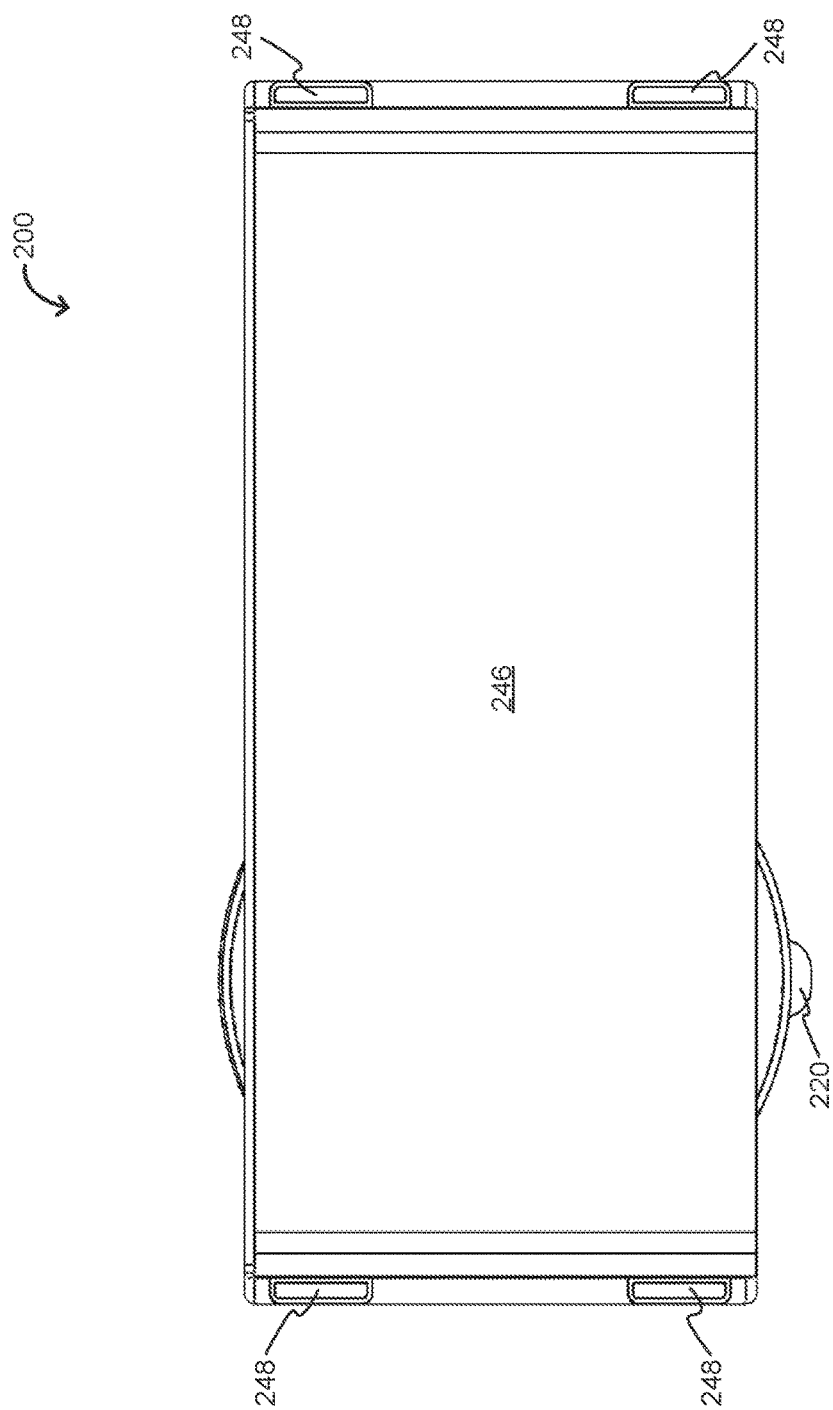
FIG. 2G illustrates a bottom view of an exemplary implementation of an egg preparation apparatus.

FIG. 2A illustrates a perspective view from above, a first side, and a second side of an exemplary implementation of an egg preparation apparatus 200. FIG. 2B illustrates a first side view of an exemplary implementation of an egg preparation apparatus 200. FIG. 2C illustrates a second side view of an exemplary implementation of an egg preparation apparatus 200. FIG. 2D illustrates a third side view of an exemplary implementation of an egg preparation apparatus 200. FIG. 2E illustrates a fourth side view of an exemplary implementation of an egg preparation apparatus 200. FIG. 2F illustrates a top view of an exemplary implementation of an egg preparation apparatus 200. FIG. 2G illustrates a bottom view of an exemplary implementation of an egg preparation apparatus 200.

In some implementations, egg preparation apparatus 200 may include one or more of a first container 202, a second container 204, an egg scorer 206, a platform 208, a first container mount 210, an egg separator 212, a hole 214, a trough 216, one or more apertures 218, a lifting tab 220, a second container mount 222, a second container pocket 224, a second container interior wall 226, one or more sidewalls 228, an internal ledge 230, a drain 232, a second container base 234, a brim 236, a scoring edge 238, a handgrip 240, an egg scorer mount 242, a platform first side 244, a platform second side 246, a non-skid surface 248, a storage compartment 250, a slide-out drawer 252, drawer slides 254, a first platform attachment mount 256, a second platform attachment mount 258, a third platform attachment mount 260, and/or other components (see FIGS. 2A-2G).

The egg preparation apparatus 200 may include one or more components that are the same as or similar to egg preparation apparatus 100 described in connection with FIG. 1. For example, a first container 202 may be the same as or similar to the first container 102 (see FIG. 1), in accordance with one or more implementations. A second container 204 may be the same as or similar to the second container 104 (see FIG. 1), in accordance with one or more implementations. An egg scorer 206 may be the same as or similar to the egg scorer 106 (see FIG. 1), in accordance with one or more implementations. A platform 208 may be the same as or similar to the platform 108 (see FIG. 1), in accordance with one or more implementations.

A first container mount 210 may be the same as or similar to the first container mount 110 (see FIG. 1), in accordance with one or more implementations. An egg separator 212 may be the same as or similar to the egg separator 112 (see FIG. 1), in accordance with one or more implementations. A hole 214 may be the same as or similar to the hole 114 (see FIG. 1), in accordance with one or more implementations. A trough 216 may be the same as or similar to the trough 116 (see FIG. 1), in accordance with one or more implementations. One or more apertures 218 may be the same as or similar to the one or more apertures 118 (see FIG. 1), in accordance with one or more implementations. A lifting tab 220 may be the same as or similar to the lifting tab 120 (see FIG. 1), in accordance with one or more implementations.

A second container mount 222 may be the same as or similar to the second container mount 122 (see FIG. 1), in accordance with one or more implementations. A second container pocket 224 may be the same as or similar to the second container pocket 124 (see FIG. 1), in accordance with one or more implementations. A second container interior wall 226 may be the same as or similar to the second container interior wall 126 (see FIG. 1), in accordance with one or more implementations. A one or more sidewalls 228 may be the same as or similar to the one or more sidewalls 128 (see FIG. 1), in accordance with one or more implementations. An internal ledge 230 may be the same as or similar to the internal ledge 130 (see FIG. 1), in accordance with one or more implementations. A drain 232 may be the same as or similar to the drain 132 (see FIG. 1), in accordance with one or more implementations. A second container base 234 may be the same as or similar to the second container base 134 (see FIG. 1), in accordance with one or more implementations. A brim 236 may be the same as or similar to the brim 136 (see FIG. 1), in accordance with one or more implementations.

A scoring edge 238 may be the same as or similar to the scoring edge 138 (see FIG. 1), in accordance with one or more implementations. A handgrip 240 may be the same as or similar to the handgrip 140 (see FIG. 1), in accordance with one or more implementations. An egg scorer mount 242 may be the same as or similar to the egg scorer mount 142 (see FIG. 1), in accordance with one or more implementations.

A platform first side 244 may be the same as or similar to the platform first side 144 (see FIG. 1), in accordance with one or more implementations. A platform second side 246 may be the same as or similar to the platform second side 146 (see FIG. 1), in accordance with one or more implementations. A non-skid surface 248 may be the same as or similar to the non-skid surface 148 (see FIG. 1), in accordance with one or more implementations. A storage compartment 250 may be the same as or similar to the storage compartment 150 (see FIG. 1), in accordance with one or more implementations. A slide-out drawer 252 may be the same as or similar to the slide-out drawer 152 (see FIG. 1), in accordance with one or more implementations. A drawer slides 254 may be the same as or similar to the drawer slides 154 (see FIG. 1), in accordance with one or more implementations. A first platform attachment mount 256 may be the same as or similar to the first platform attachment mount 156 (see FIG. 1), in accordance with one or more implementations. A second platform attachment mount 258 may be the same as or similar to the second platform attachment mount 158 (see FIG. 1), in accordance with one or more implementations. A third platform attachment mount 260 may be the same as or similar to the third platform attachment mount 160 (see FIG. 1), in accordance with one or more implementations.

Figure 3A:
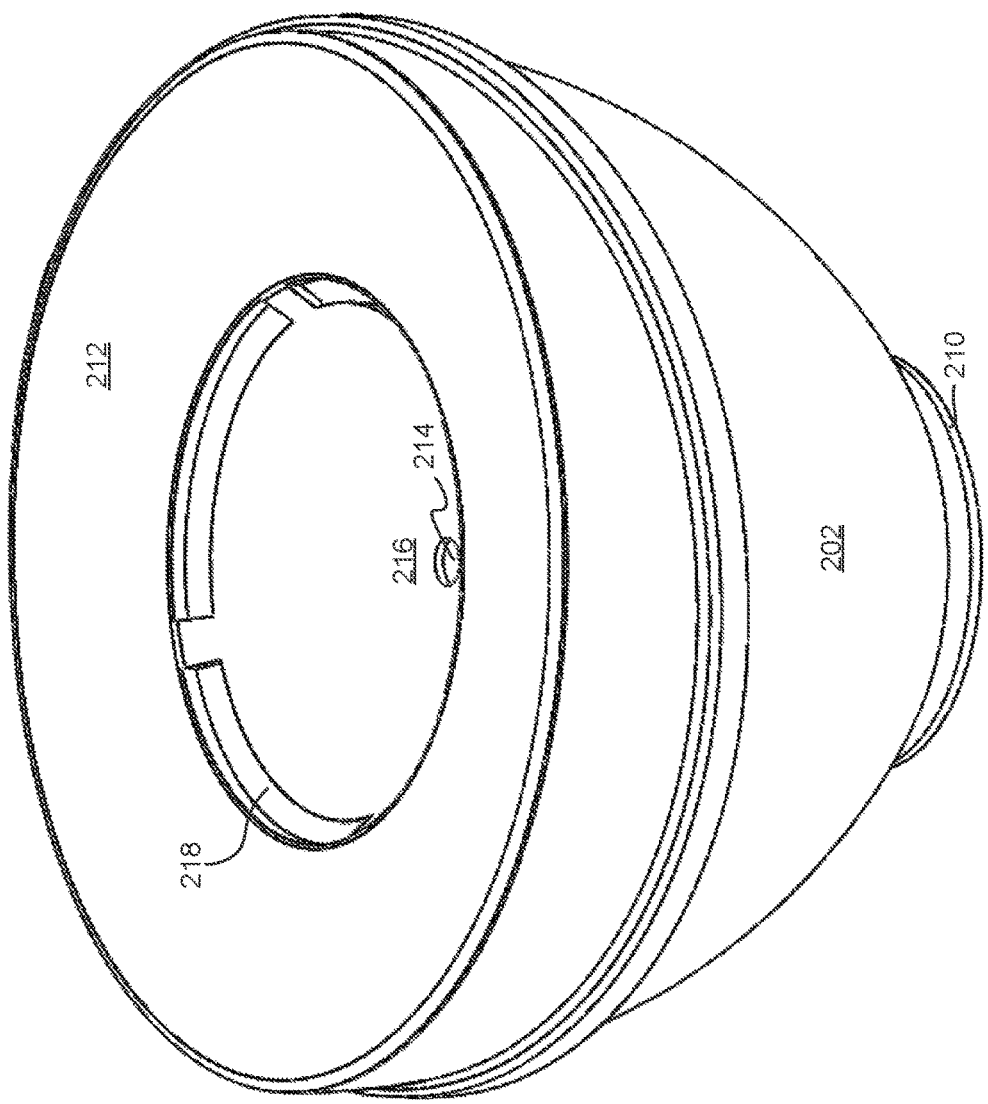
FIG. 3A illustrates a perspective view from above, a first side, and a second side of an exemplary implementation of a first container.
Figure 3B:
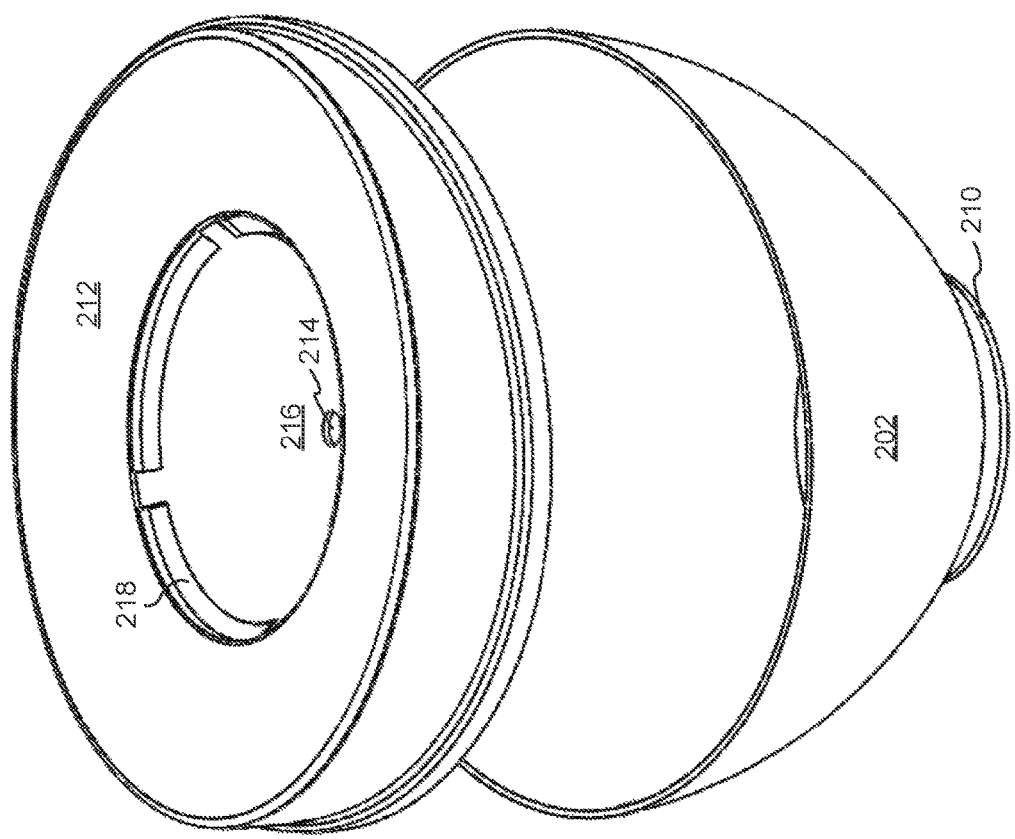
FIG. 3B illustrates a perspective view from above, a first side, and a second side of an exemplary implementation of a first container.
Figure 3C:
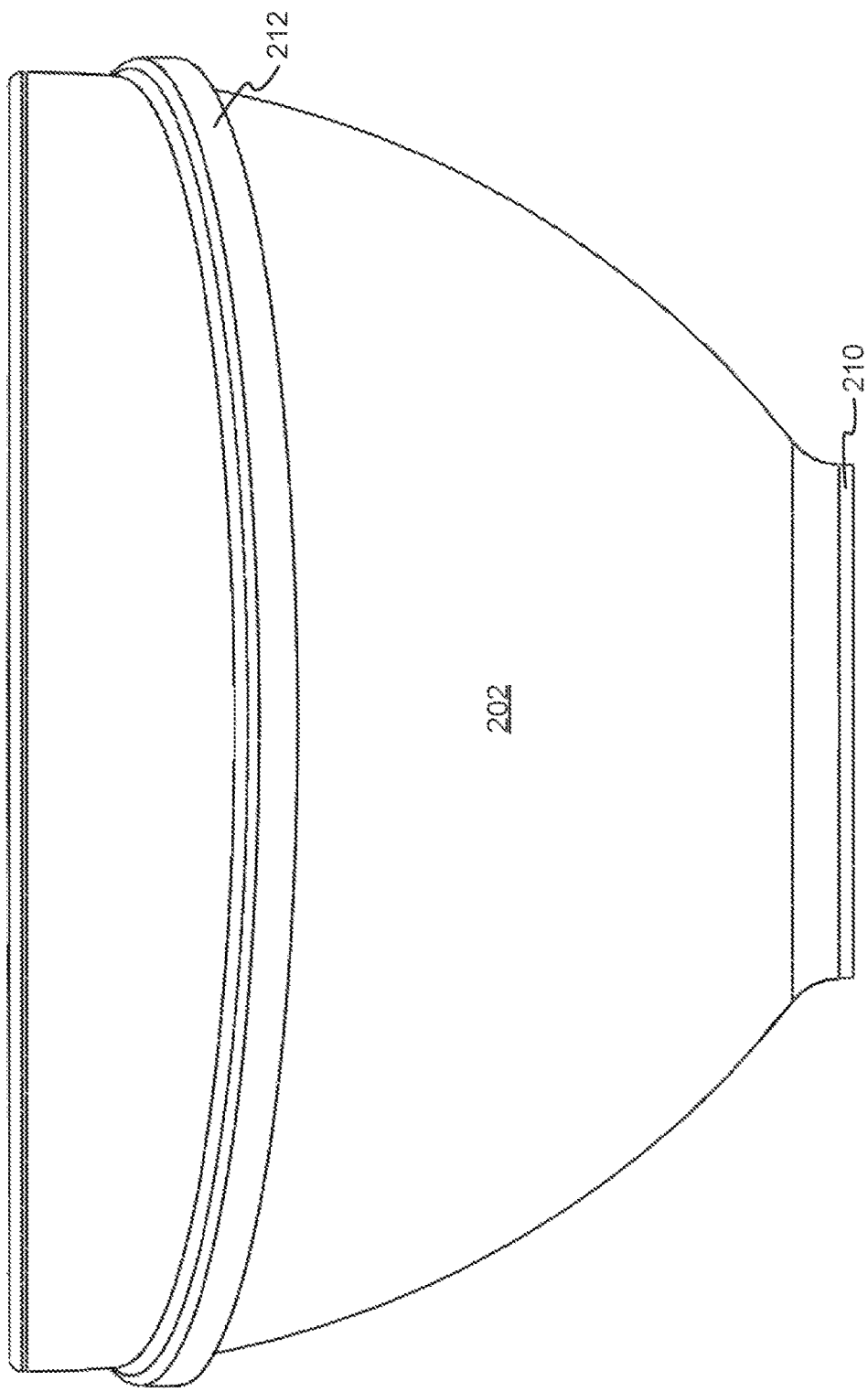
FIG. 3C illustrates a first side view of an exemplary implementation of a first container.
Figure 3D:
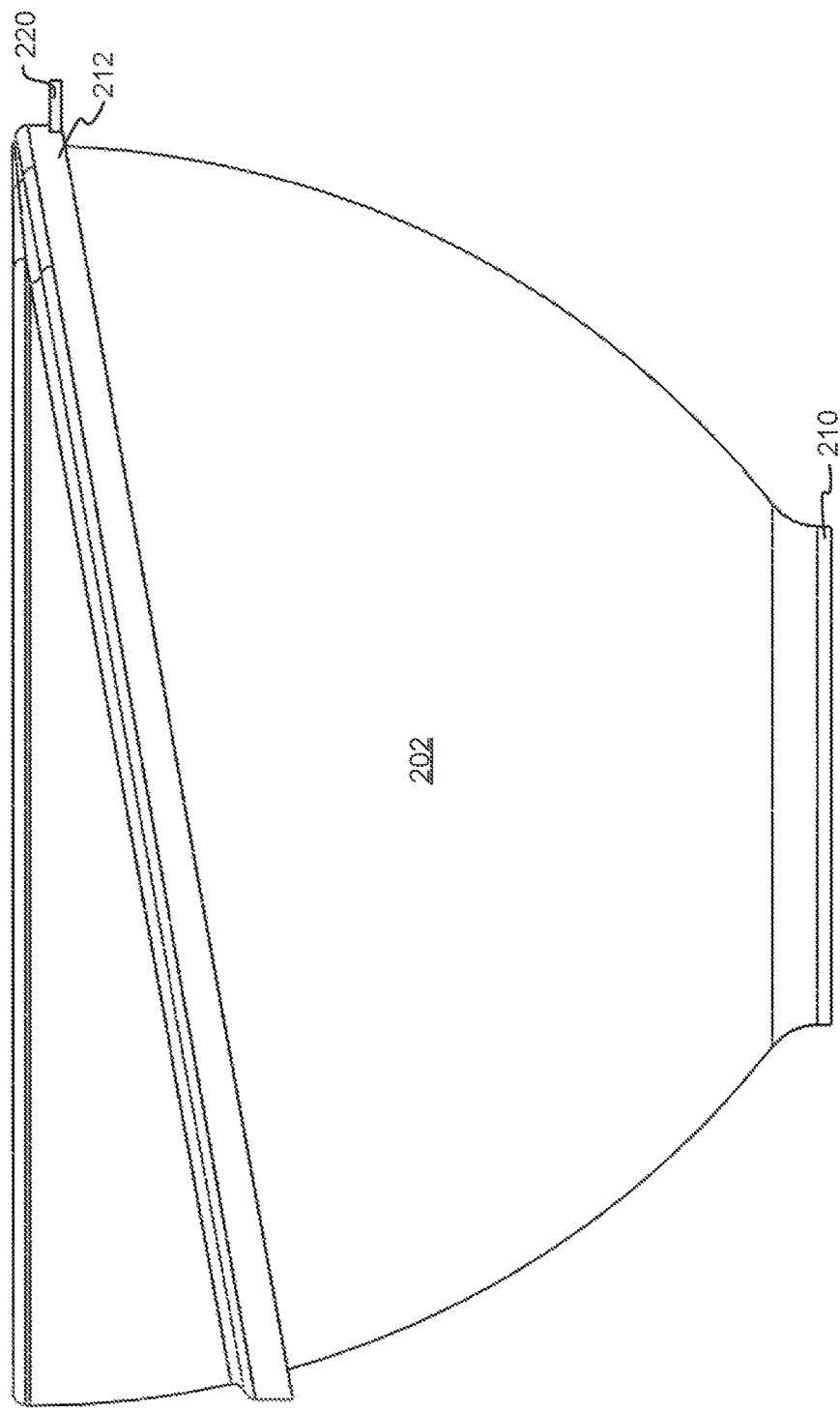
FIG. 3D illustrates a second side view of an exemplary implementation of a first container.
Figure 3E:
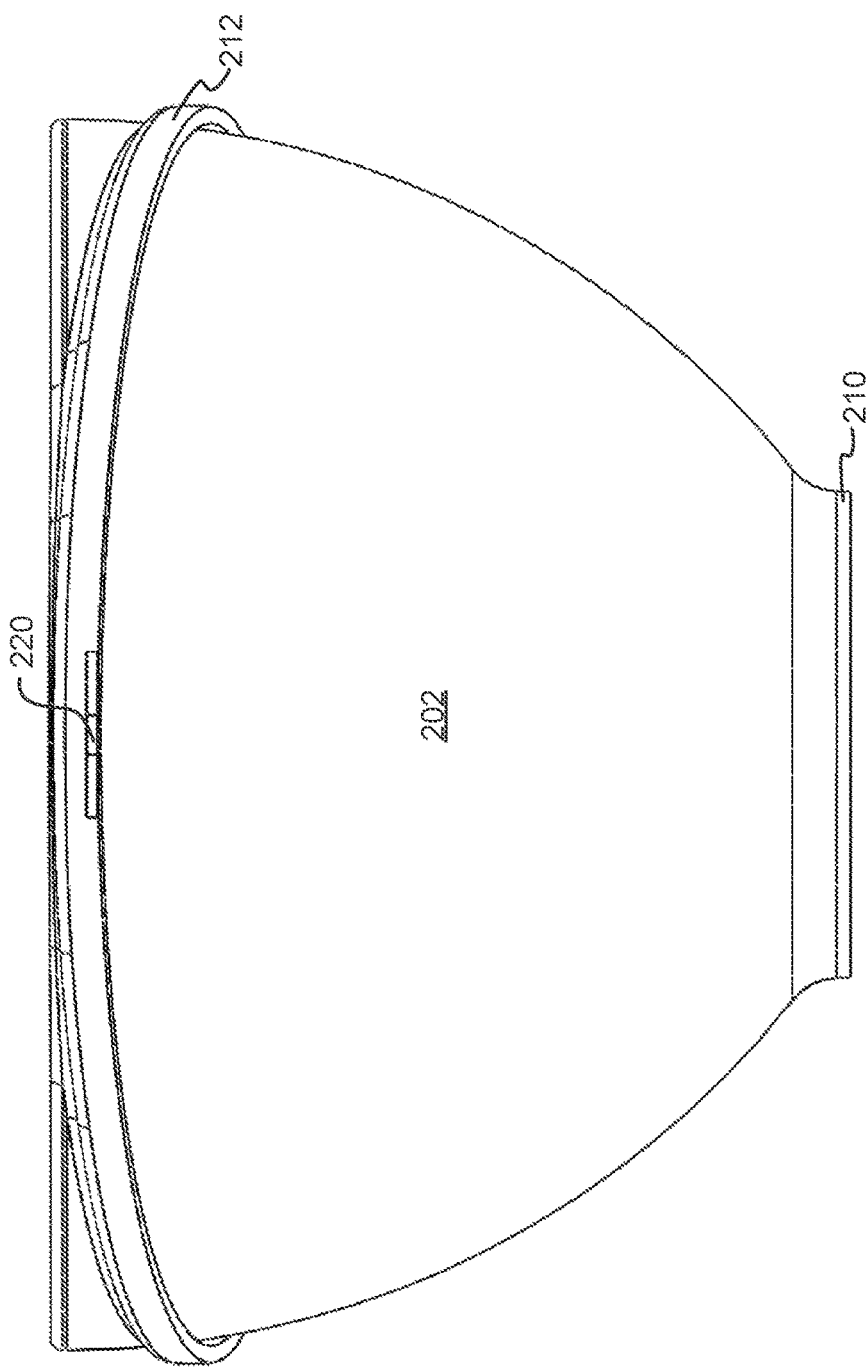
FIG. 3E illustrates a third side view of an exemplary implementation of a first container.
Figure 3F:
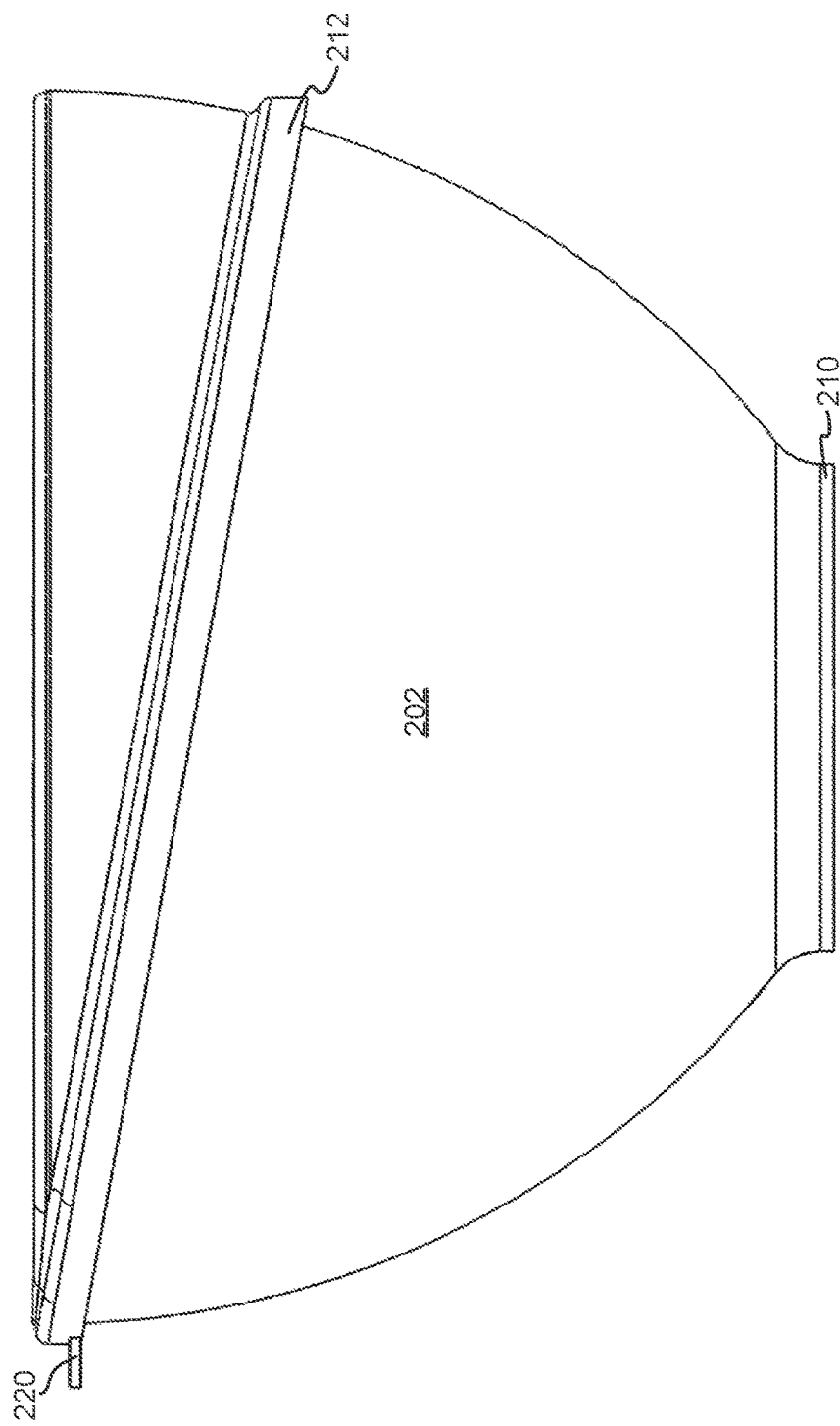
FIG. 3F illustrates a fourth side view of an exemplary implementation of a first container.
Figure 3H:
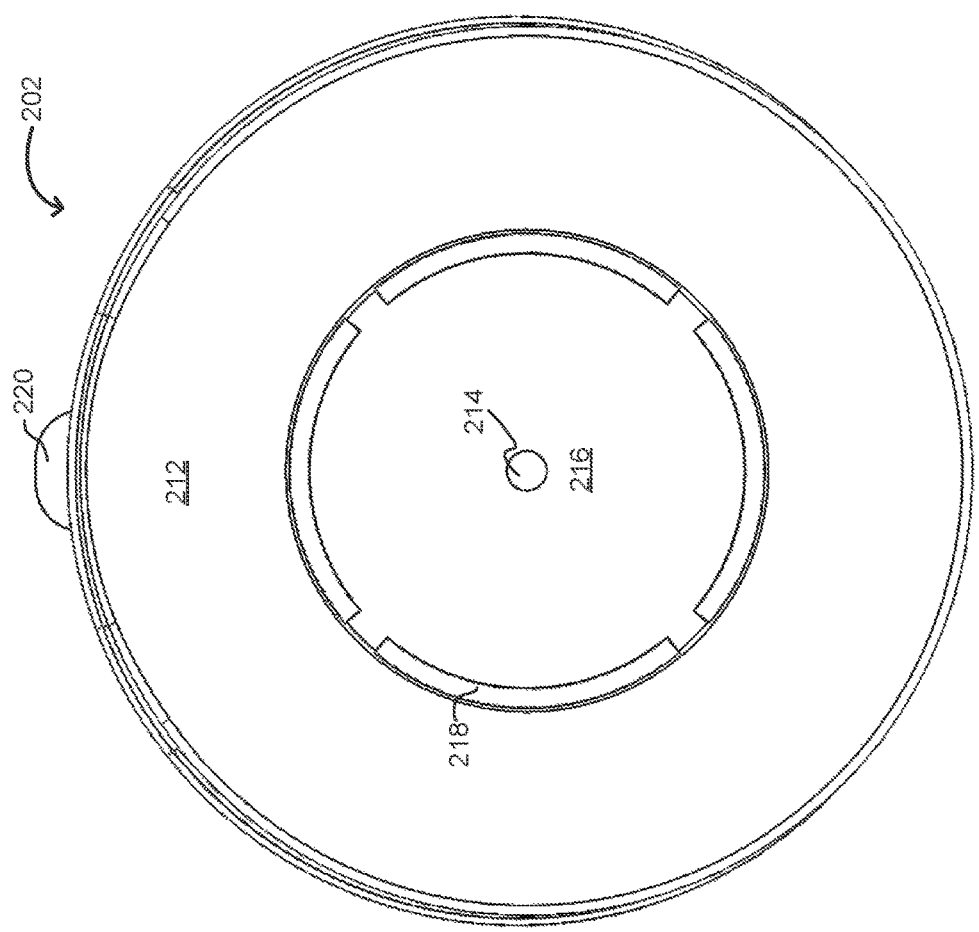
FIG. 3H illustrates a top view of an exemplary implementation of a first container.

FIG. 3A illustrates a perspective view from above, a first side, and a second side of an exemplary implementation of a first container 202. FIG. 3B illustrates a perspective view from above, a first side, and a second side of an exemplary implementation of a first container 202. FIG. 3C illustrates a first side view of an exemplary implementation of a first container 202. FIG. 3D illustrates a second side view of an exemplary implementation of a first container 202. FIG. 3E illustrates a third side view of an exemplary implementation of a first container 202. FIG. 3F illustrates a fourth side view of an exemplary implementation of a first container 202. FIG. 3G illustrates a bottom view of an exemplary implementation of a first container 202. FIG. 3H illustrates a top view of an exemplary implementation of a first container 202.

Figure 4A:
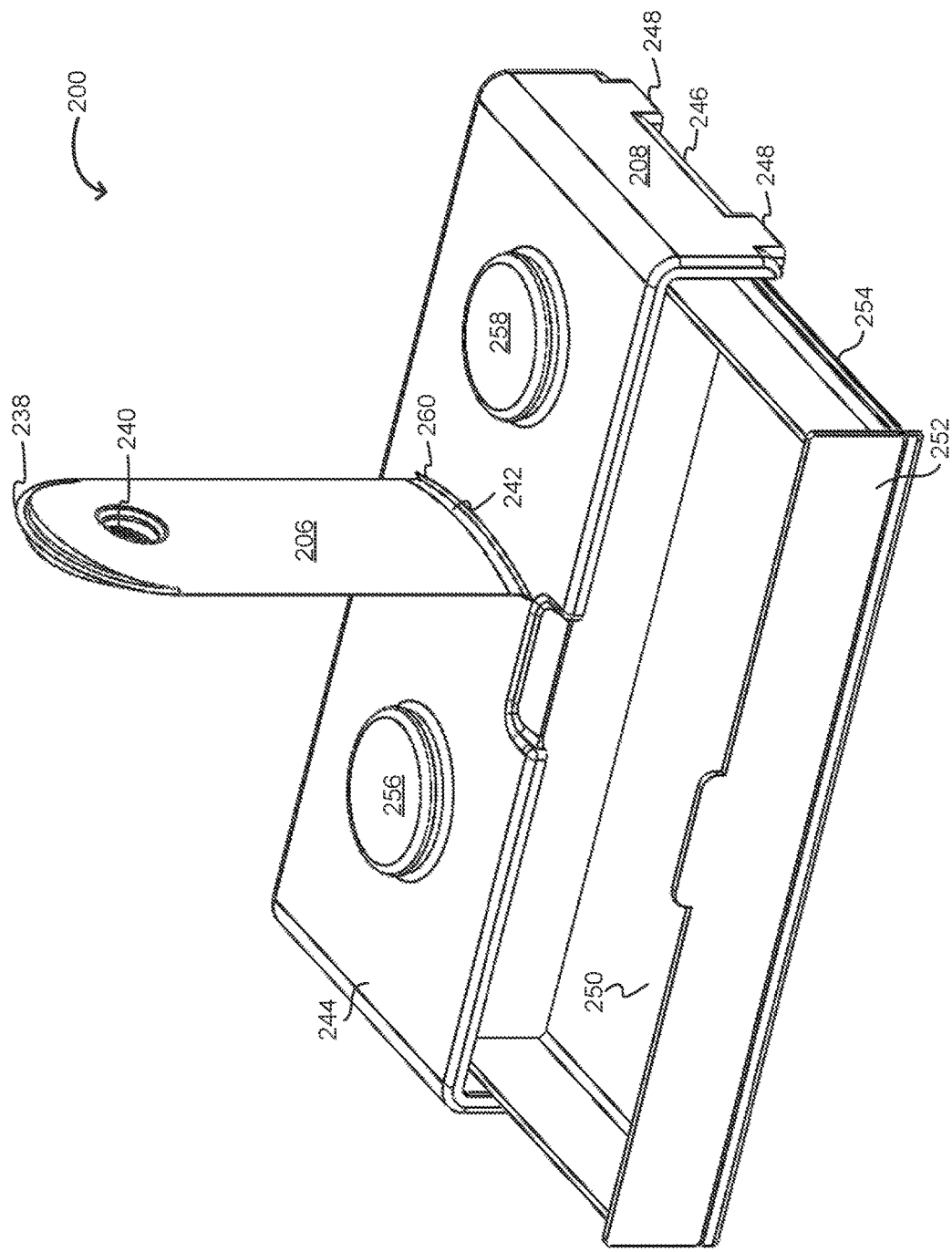
FIG. 4A illustrates a perspective view from above, a first side, and a second side of an exemplary implementation of an egg preparation apparatus.
Figure 4C:
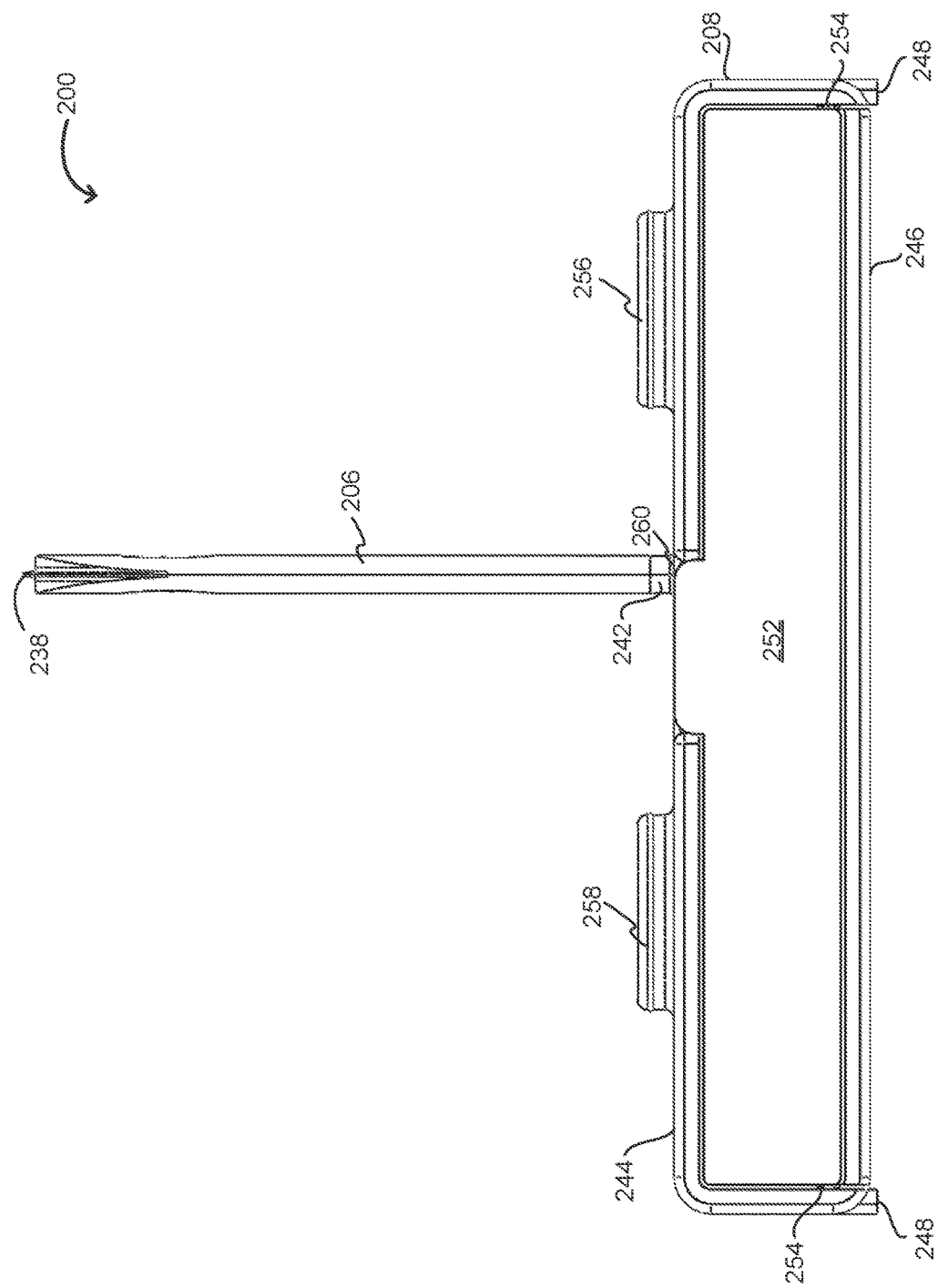
FIG. 4C illustrates a first side view of an exemplary implementation of an egg preparation apparatus.

FIG. 4A illustrates a perspective view from above, a first side, and a second side of an exemplary implementation of an egg preparation apparatus 200. FIG. 4B illustrates a perspective view from above, a first side, and a second side of an exemplary implementation of an egg preparation apparatus 200. FIG. 4C illustrates a first side view of an exemplary implementation of an egg preparation apparatus 200. FIG. 4D illustrates a second side view of an exemplary implementation of an egg preparation apparatus 200. FIG. 4E illustrates a third side view of an exemplary implementation of an egg preparation apparatus 200. FIG. 4F illustrates a fourth side view of an exemplary implementation of an egg preparation apparatus 200. FIG. 4G illustrates a bottom view of an exemplary implementation of an egg preparation apparatus 200. FIG. 4H illustrates a top view of an exemplary implementation of an egg preparation apparatus 200.

Figure 5A:
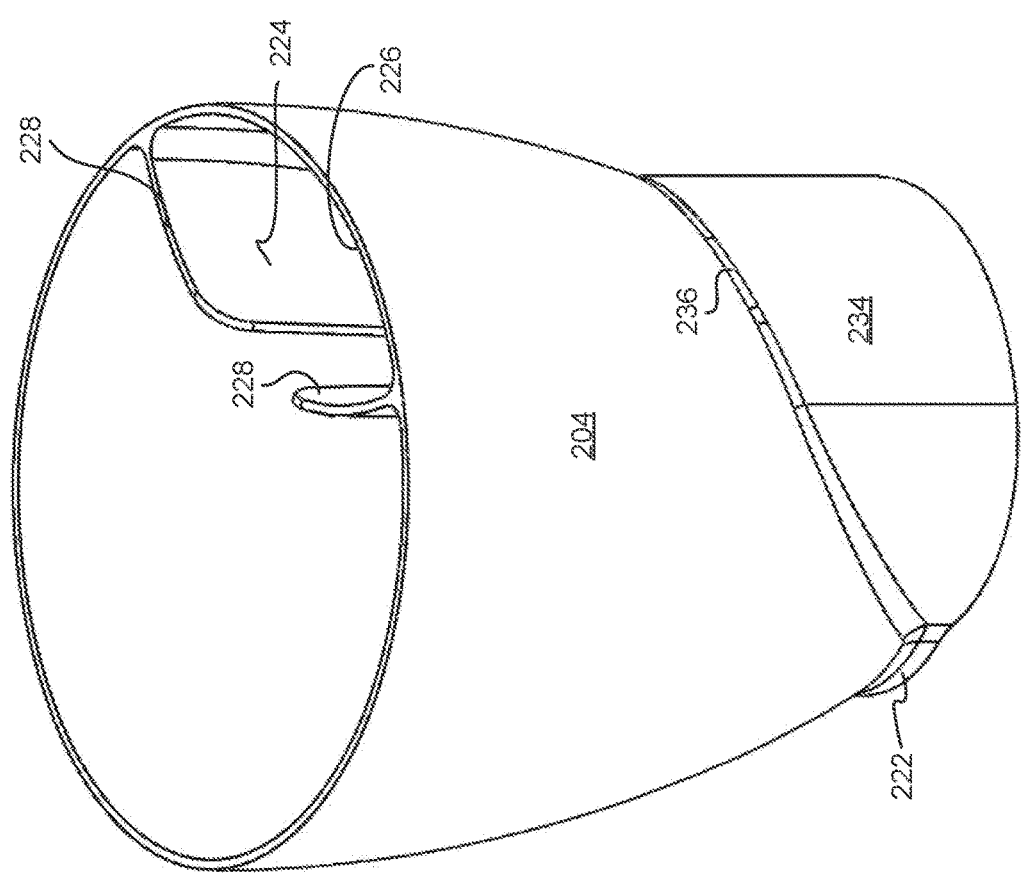
FIG. 5A illustrates a perspective view from above, a first side, and a second side of an exemplary implementation of a second container.
Figure 5B:
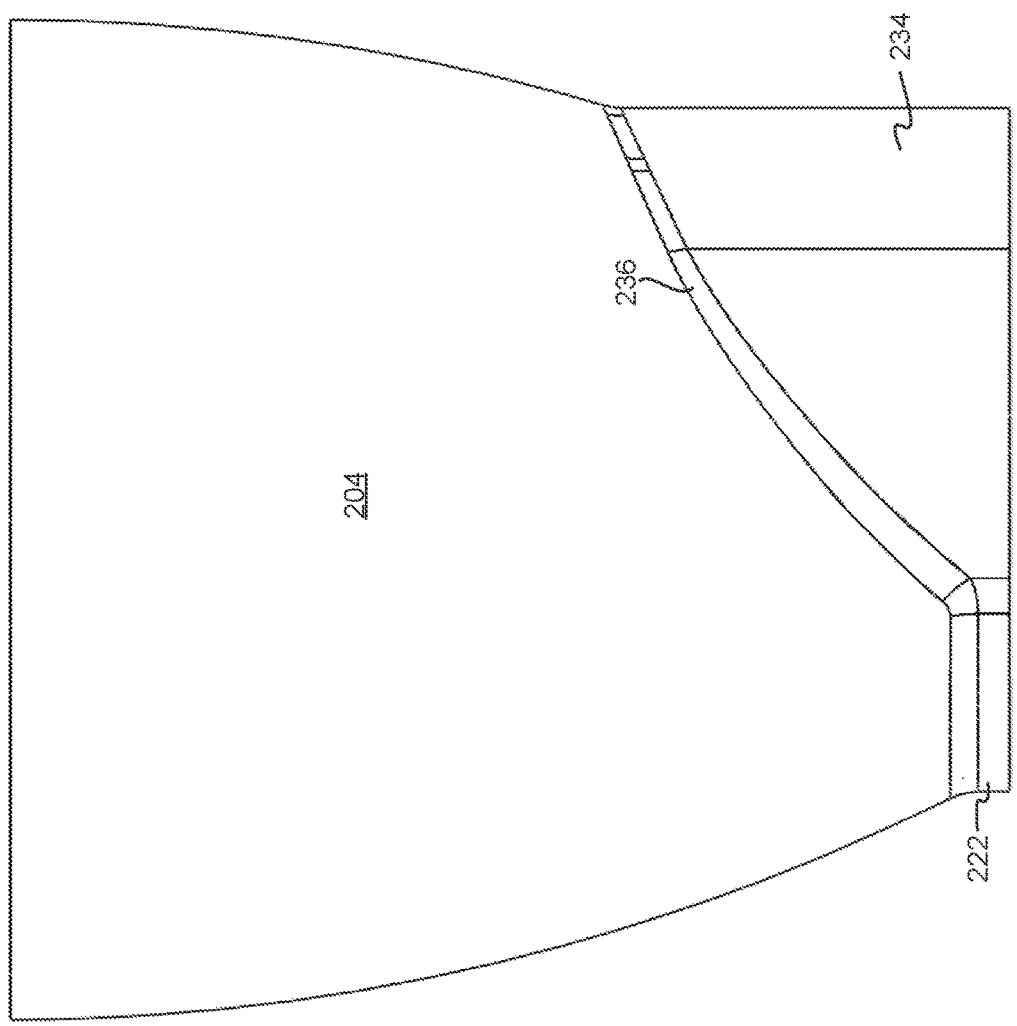
FIG. 5B illustrates a first side view of an exemplary implementation of a second container.
Figure 5C:
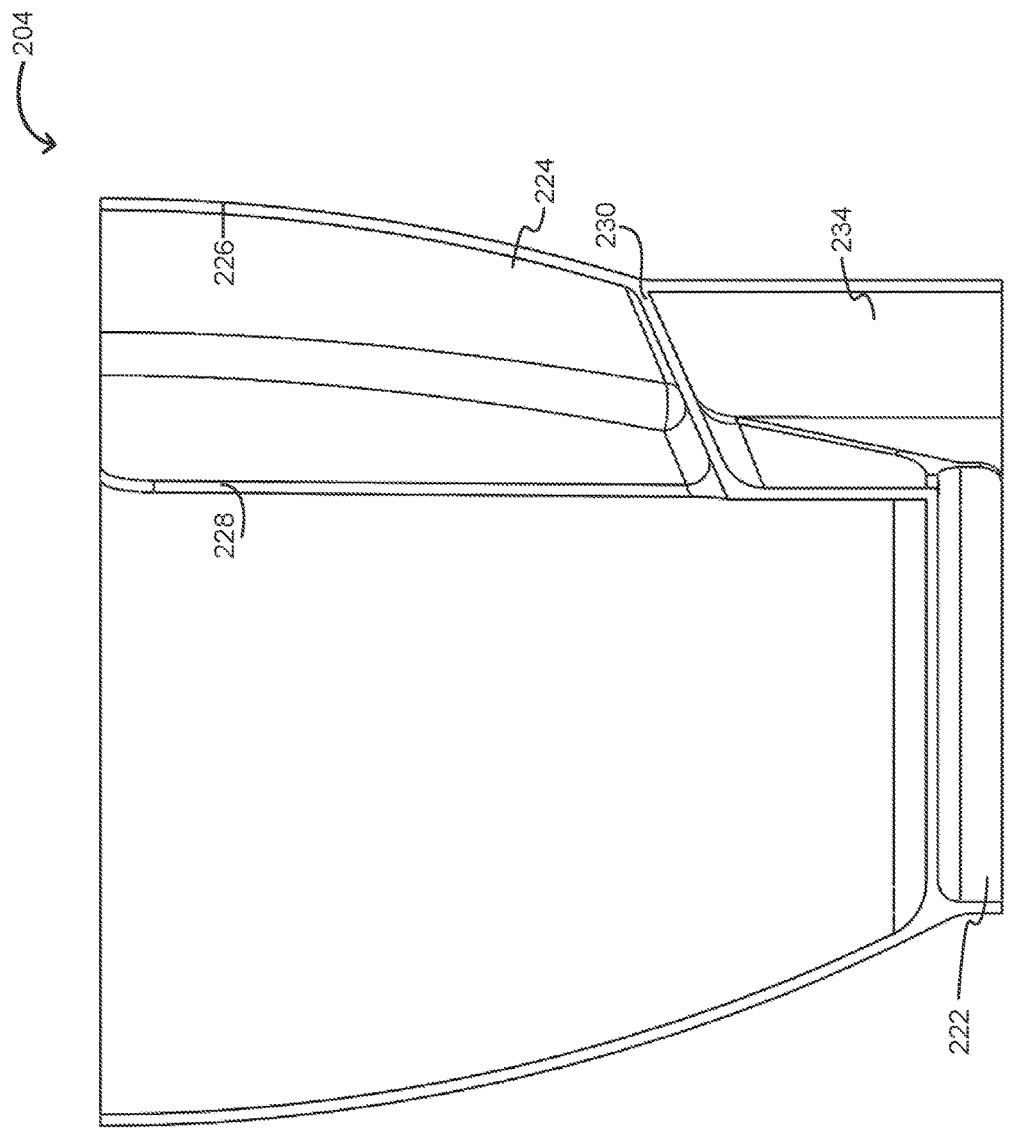
FIG. 5C illustrates a cross-sectional view from a first side of an exemplary implementation of a second container.
Figure 5G:
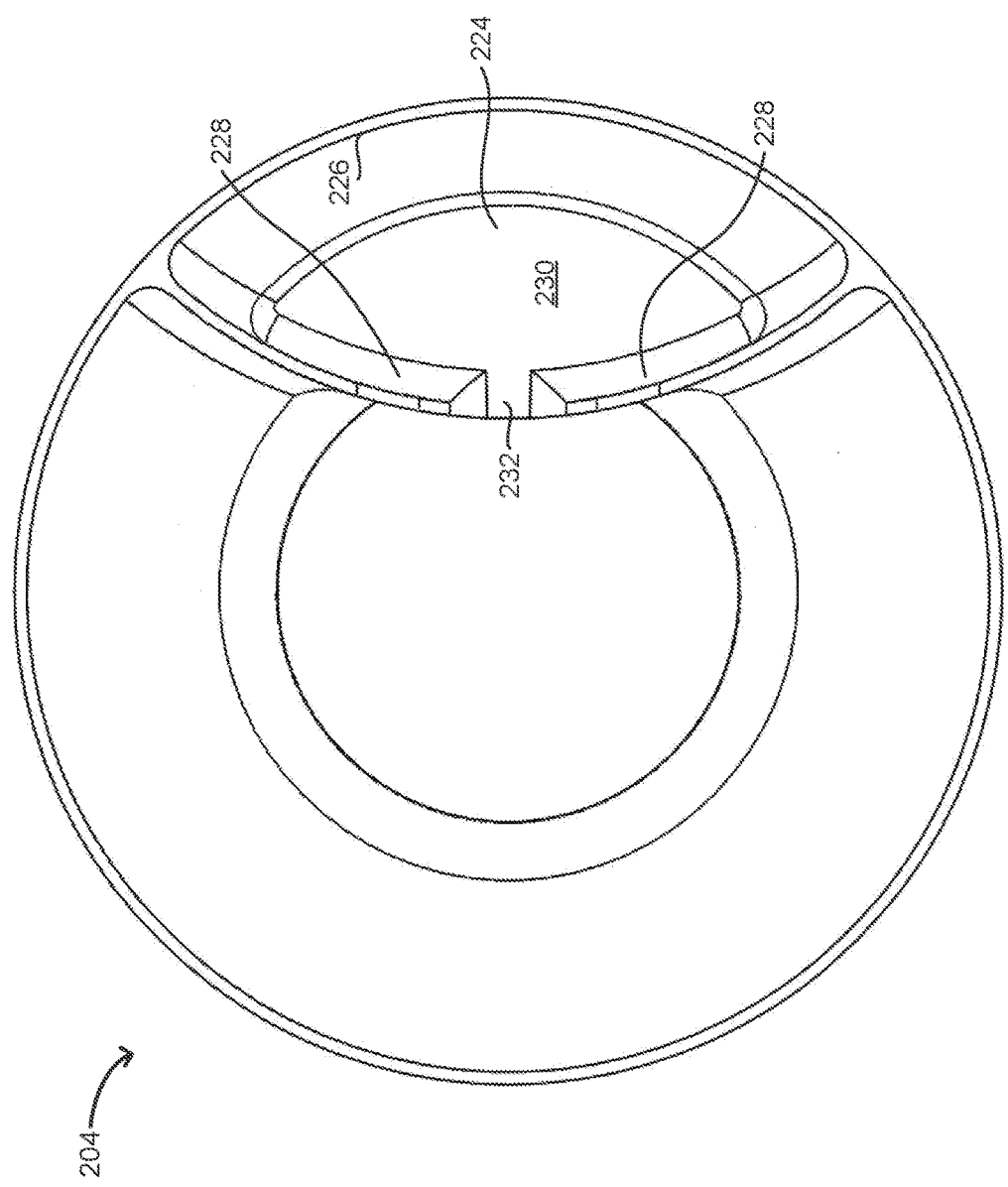
FIG. 5G illustrates a top view of an exemplary implementation of a second container.
Figure 5H:
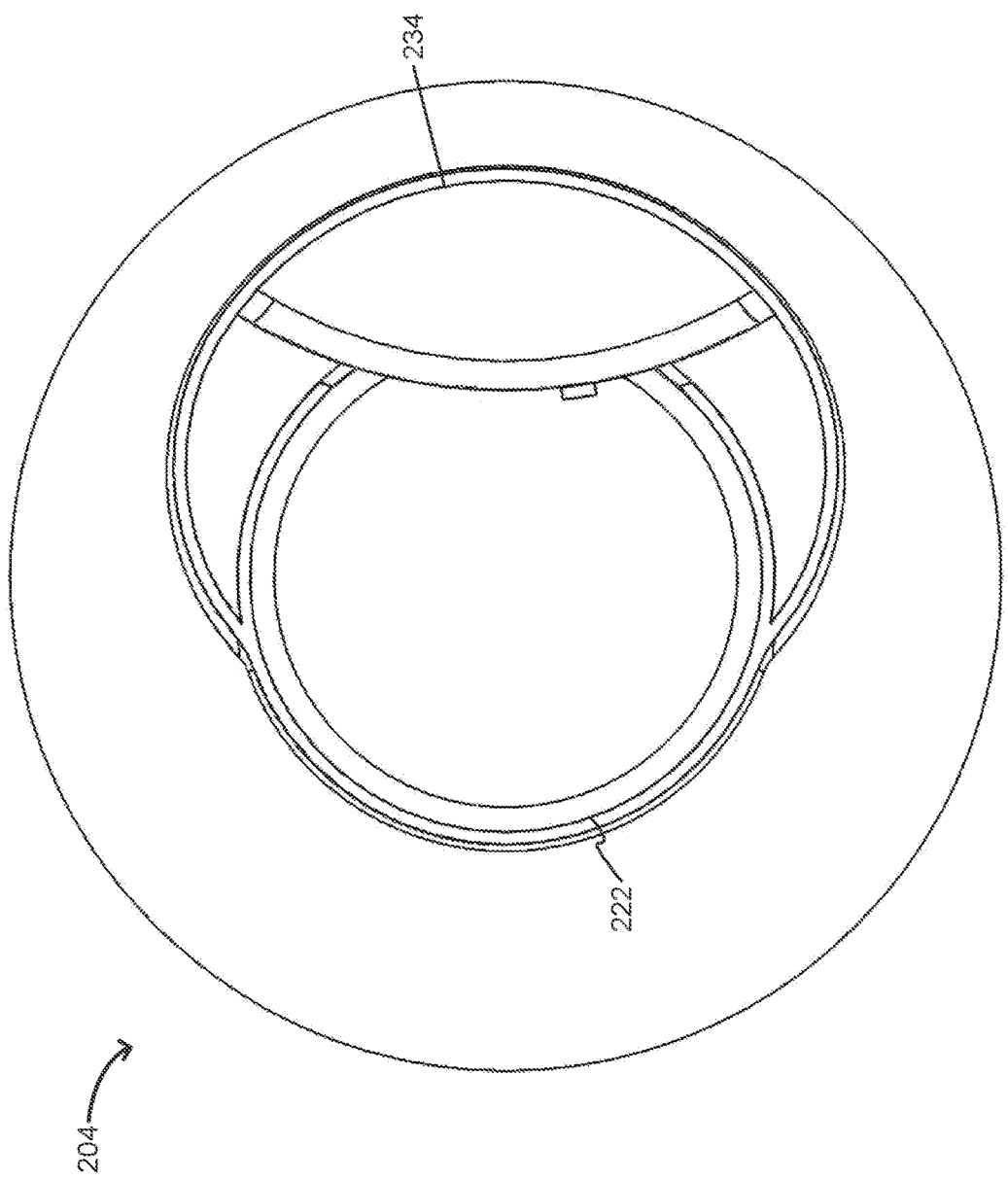
FIG. 5H illustrates a bottom view of an exemplary implementation of a second container.

FIG. 5A illustrates a perspective view from above, a first side, and a second side of an exemplary implementation of a second container 204. FIG. 5B illustrates a first side view of an exemplary implementation of a second container 204. FIG. 5C illustrates a cross-sectional view from a first side of an exemplary implementation of a second container 204. FIG. 5D illustrates a second side view of an exemplary implementation of a second container 204. FIG. 5E illustrates a third side view of an exemplary implementation of a second container 204. FIG. 5F illustrates a fourth side view of an exemplary implementation of a second container 204. FIG. 5G illustrates a top view of an exemplary implementation of a second container 204. FIG. 5H illustrates a bottom view of an exemplary implementation of a second container 204.

While implementations of this disclosure are described in the context of egg preparation, this should not be interpreted as limiting as other contexts are contemplated. For example, in one or more implementations, the egg preparation apparatus 200 may be an apparatus for meal preparation configured to mix, blend, chop, dispose, and/or prepare other ingredients for a meal.

Although the present technology has been described in detail for the purpose of illustration second container based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An apparatus configured for preparing eggs, the apparatus comprising:

a platform comprising a platform first side opposite from a platform second side, the platform first side being a top side of the platform during use, the platform further comprising three separate and distinct platform attachment mounts disposed directly on the platform first side, the three separate and distinct platform attachment mounts including a first platform attachment mount, a second platform attachment mount, and a third platform attachment mount;

a first container configured to be removably coupled with the first platform attachment mount by way of a first container mount disposed on an external surface of a bottom of the first container, the first container being configured to receive one or both of egg whites or egg yolks via an opening at a top of the first container;

a second container configured to be removably coupled with the second platform attachment mount by way of a second container mount disposed on an external surface of a bottom of the second container, the second container being configured to receive one or more egg shells via an opening at a top of the second container, the second container comprising a second container pocket being configured to receive and contain utensils used for mixing eggs, the pocket having a second container pocket opening provided at the top of the second container and being defined by at least one internal sidewall spaced inwardly from an internal wall of the second container and an internal ledge extending from the internal wall towards a center of the second container at an downward angle relative to the bottom of the second container and meeting the at least one internal sidewall, wherein the internal ledge is provided between the second container pocket opening and the bottom of the second container and further comprises a drain positioned adjacent to the at least one internal sidewall that is configured to allow egg residue on the utensils to flow out of the second container pocket; and wherein the bottom of the second container further comprises a second container base portion adjacent to its second container mount that is defined by an external sidewall of the second container, the second container base portion being positioned below the internal ledge and pocket; and an egg scorer configured to be removably coupled with the third platform attachment mount by way of an egg scorer mount disposed on an external surface of a bottom of the egg scorer, the egg scorer comprising a scoring edge positioned on its top opposite the egg scorer mount, the scoring edge being configured to facilitate one or more of cutting, scoring, or cracking open egg shells.

2. The apparatus of claim 1, wherein the platform comprises a non-skid surface disposed on the platform second side, the non-skid surface being configured to maintain a position of the platform on a working surface.

3. The apparatus of claim 1, wherein the platform comprises a storage compartment disposed within the platform between the platform first side and the platform second side, the storage compartment being configured to store one or more of the first container, the second container, or the egg scorer.

4. The apparatus of claim 3, wherein the storage compartment comprises a slide-out drawer configured for movement relative to the platform, the slide-out drawer providing access to within the storage compartment.

5. The apparatus of claim 3, wherein the storage compartment has a containment volume in a range between approximately two liters and approximately 30 liters.

6. The apparatus of claim 1, further comprising an egg separator configured to removably couple with a rim defining the opening at the top of the first container, the egg separator being configured to facilitate separating egg yolks from egg whites.

7. The apparatus of claim 6, wherein the egg separator comprises a concave shape with a hole disposed at a trough of the concave shape such that egg whites are allowed to pass through the hole into the first container and egg yolks are retained in the trough.

8. The apparatus of claim 1, wherein the first container has a containment volume in a range between approximately 100 milliliters and approximately two liters and the second container has a containment volume in a range between approximately 100 milliliters and approximately one liter.

9. The apparatus of claim 1, wherein one or more of the platform, the first container, the second container, or the egg scorer is formed of one or more of plastic, polymer, rubber, metal, wood, ceramics, plywood, aluminum, fiberglass, carbon fiber, or laminate such that the first container, the second container, and the egg scorer are formed of dishwasher safe materials and configured to be disassembled for dishwasher washing.

10. The apparatus of claim 1, wherein a footprint of the platform is shaped as one or more of a square, a rectangle, a circle, a polygon, or an ellipse.

11. The apparatus of claim 10, wherein the footprint of the platform has a width of approximately 15 centimeters to approximately 40 centimeters, a length of approximately 30 centimeters to approximately 70 centimeters, and a height of approximately 5 centimeters to approximately 20 centimeters.

12. The apparatus of claim 1, wherein the scoring edge is disposed on a pedestal, the pedestal comprising a handgrip configured to facilitate manually moving the apparatus, wherein the scoring edge disposed in a slot at a peak of the pedestal such that the scoring edge protrudes out from the slot of the egg scorer, and wherein the scoring edge is configured to be removable from the slot.

13. The apparatus of claim 1, wherein the first platform attachment mount, the second platform attachment mount, and the third platform attachment mount removably couple, respectively, with the first container mount, the second container mount, and the egg scorer mount by way of one or more of a twist-lock, a twist-lock teeth, a snap-in teeth, a press-fit, a clamp, a latch, suction cups, or magnets.

14. The apparatus of claim 4, wherein the platform comprises drawer slides disposed on two opposing internal surfaces thereof to accommodate and facilitate the movement of the slide out drawer.

15. The apparatus of claim 1, wherein the first container is bowl shaped, a footprint of the first container being a circle, and wherein a circle diameter at the opening of the first container is larger than a diameter that is proximate to the first container mount.

16. The apparatus of claim 1, wherein a footprint of the second container opening is a circle, wherein a circle diameter at the opening of the second container is larger than a combined dimension of the second container mount and the second container base portion.

17. The apparatus of claim 16, wherein the second container base portion has a flat surface on an external side contiguous to the second container pocket and about perpendicular to a second side comprising the second container mount, the second container base portion further comprising a brim with curvature conforming to an external structure of the second container.

18. The apparatus of claim 1, wherein the second container pocket further comprises a vertical slot provided in its at least one internal sidewall that extends from a top side of the pocket opening towards the bottom side of the second container, the vertical slot configured to accommodate a portion of one or more utensils therein.

19. The apparatus of claim 1, wherein the first attachment mount and the second platform attachment mount have a similar shape and wherein the third platform attachment mount comprises a different shape than the first attachment mount and the second platform attachment mount.

20. The apparatus of claim 12, wherein the handgrip comprises an aperture through the pedestal, the aperture being positioned below its scoring edge.

* * * * *